US012807045B2

(12) United States Patent
Aoki et al.

(10) Patent No.: US 12,807,045 B2
(45) Date of Patent: Nov. 24, 2026

(54) CONVEYANCE SEAT

(71) Applicant: TS TECH CO., LTD., Saitama (JP)

(72) Inventors: Yuto Aoki, Tochigi (JP); Tadanori Masuda, Tochigi (JP); Kei Okuma, Tochigi (JP); Hidetsune Nonaka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 178 days.

(21) Appl. No.: 18/950,477

(22) Filed: Nov. 18, 2024

(65) Prior Publication Data

US 2025/0074267 A1 Mar. 6, 2025

Related U.S. Application Data

(63) Continuation of application No. 18/466,072, filed on Sep. 13, 2023, now Pat. No. 12,179,641, which is a
(Continued)

(30) Foreign Application Priority Data

Jul. 17, 2019 (JP) ................................ 2019-132011

(51) Int. Cl.
*B60N 2/16* (2006.01)
*B60N 2/00* (2006.01)
*B60N 2/68* (2006.01)

(52) U.S. Cl.
CPC ......... *B60N 2/1615* (2013.01); *B60N 2/0025* (2023.08); *B60N 2/003* (2023.08);
(Continued)

(58) Field of Classification Search
CPC ...... B60N 2/1615; B60N 2/7047; B60N 2/07; B60N 2/073; B60N 2/003
See application file for complete search history.

(56) References Cited

U.S. PATENT DOCUMENTS 6,276,650 B1 8/2001 Kojima et al.
7,360,460 B2 4/2008 Diehl et al.
(Continued)

FOREIGN PATENT DOCUMENTS

CN 107933381 A 4/2018
CN 113715699 A 11/2021
(Continued)

OTHER PUBLICATIONS

Japanese Office Action mailed on May 9, 2023 from the Japan Patent Office (JPO) for the related Japanese Patent Application No. 2019-132011, with English machine translation.
(Continued)

*Primary Examiner* — Timothy J Brindley
(74) *Attorney, Agent, or Firm* — Michael Best & Friedrich LLP

(57) ABSTRACT

A vehicle seat includes a seat cushion provided with a seat cushion frame, a front link configured to adjust a height of the seat cushion with respect to a base that is a slide rail or a vehicle body floor, and a front load detection sensor attached to an upper rail and configured to detect a load applied to the vehicle seat. The seat cushion frame includes a pair of side frames separated from each other in a seat width direction, the front link includes a first rotation shaft configured to be rotatable with respect to the seat cushion frame and a second rotation shaft configured to be rotatable with respect to the base, and the front load detection sensor is arranged at a position different from the second rotation shaft in a front to back direction of the seat.

20 Claims, 20 Drawing Sheets

Related U.S. Application Data continuation of application No. 17/890,307, filed on Aug. 18, 2022, now Pat. No. 11,794,614, which is a continuation of application No. 16/928,400, filed on Jul. 14, 2020, now Pat. No. 11,420,537.

(52) U.S. Cl.
CPC ............ *B60N 2/0031* (2023.08); *B60N 2/68* (2013.01); *B60N 2210/42* (2023.08)

(56) References Cited

U.S. PATENT DOCUMENTS

| | | | |
|---|---|---|---|
| 7,597,011 | B2 | 10/2009 | Krivtsov et al. |
| 7,762,150 | B2 | 7/2010 | Kawabata et al. |
| 9,085,246 | B1 | 7/2015 | Pywell et al. |
| 10,086,723 | B1 | 10/2018 | Watanabe |
| 2004/0108146 | A1 | 6/2004 | Rundell et al. |
| 2007/0145224 | A1 | 6/2007 | Yamada et al. |
| 2011/0094317 | A1 | 4/2011 | Aoyama et al. |
| 2011/0095580 | A1 | 4/2011 | Inayoshi et al. |
| 2011/0098891 | A1 | 4/2011 | Inayoshi et al. |
| 2013/0025377 | A1 | 1/2013 | Ozawa et al. |
| 2013/0025378 | A1 | 1/2013 | Ozawa et al. |
| 2014/0224041 | A1 | 8/2014 | Ozawa et al. |
| 2014/0224553 | A1 | 8/2014 | Ozawa |
| 2015/0035327 | A1 | 2/2015 | Ferenc et al. |
| 2017/0246966 | A1 | 8/2017 | Hayashi |
| 2017/0341530 | A1 | 11/2017 | Shinozaki et al. |
| 2018/0272906 | A1 | 9/2018 | Onuma et al. |
| 2018/0272909 | A1 | 9/2018 | Misono et al. |
| 2019/0152352 | A1 | 5/2019 | Handigol et al. |
| 2020/0001749 | A1 | 1/2020 | Cieslak et al. |
| 2021/0170918 | A1 | 6/2021 | Kim et al. |

FOREIGN PATENT DOCUMENTS

| | | | |
|---|---|---|---|
| DE | 10239385 | A1 | 3/2004 |
| EP | 3674135 | A1 | 7/2020 |
| JP | 2003-127742 | A | 5/2003 |
| JP | 2007-168664 | A | 7/2007 |
| JP | 2009-036564 | A | 2/2009 |
| JP | 2009-274647 | A | 11/2009 |
| JP | 2017-154533 | A | 9/2017 |
| JP | 2018-161914 | A | 10/2018 |
| JP | 2018-199353 | A | 12/2018 |
| JP | 2019-069784 | A | 5/2019 |
| WO | 2012049725 | A1 | 4/2012 |
| WO | 2013/021912 | A1 | 2/2013 |
| WO | 2017168102 | A1 | 10/2017 |
| WO | 2020054678 | A1 | 3/2020 |

OTHER PUBLICATIONS

Japanese Office Action mailed on Mar. 5, 2024 from the Japan Patent Office (JPO) for the related Japanese Patent Application No. 2023-105201, with English machine translation.

Japanese Office Action mailed on Oct. 21, 2025 from the Japan Patent Office (JPO) for the related Japanese Patent Application No. 2024-135434, with English machine translation.

CONVEYANCE SEAT

CROSS REFERENCE TO RELATED APPLICATIONS

This application is a continuation of U.S. patent application Ser. No. 18/466,072 filed on Sep. 13, 2023, which, in turn, is a continuation of U.S. patent application Ser. No. 17/890,307 (now U.S. Pat. No. 11,794,614) filed on Aug. 18, 2022, which, in turn, is a continuation of U.S. patent application Ser. No. 16/928,400 (now U.S. Pat. No. 11,420,537) filed on Jul. 14, 2020. Further, this application is based on and claims the benefit of priority from the prior Japanese Patent Application JP 2019-132011, filed on Jul. 17, 2019, the entire contents of which are incorporated herein by reference.

BACKGROUND OF THE INVENTION

Field of the Invention

The present invention relates to a conveyance seat, and particularly to a vehicle seat including a height adjustment mechanism that adjusts a height of a seat cushion and a load detection device that detects the load of an occupant.

Description of the Related Art

A vehicle seat including a height adjustment mechanism that adjusts a height of a seat cushion and a load detection sensor that detects a load of an occupant is known (U.S. Pat. No. 7,360,460 and US Patent Application Publication No. 2014/0224553). The height adjustment mechanism is provided with a link member that is a rotating body that rotates to change the height of the seat cushion. The link member is interposed between the seat cushion and a slide rail mechanism, and rotates to move the seat cushion in an up to down direction.

In the vehicle seat described in U.S. Pat. No. 7,360,460 and US Patent Application Publication No. 2014/0224553, the load detection sensor includes a shaft member, and the load detection sensor is arranged to overlap with a rotation shaft of the link member provided in the height adjustment mechanism in a seat front to back direction of the vehicle seat, resulting in an increase in size in the up to down direction of the vehicle seat.

SUMMARY OF THE INVENTION

Therefore, the present invention has been made in view of the above problem, and an object thereof is to provide a conveyance seat including a height adjustment mechanism and a load detection sensor and preventing an increase in size.

The problem described above is solved by a conveyance seat according to an aspect of the present invention, the conveyance seat including: a seat cushion provided with a seat cushion frame; a first link member configured to adjust a height of the seat cushion with respect to a base that is a slide rail or a vehicle body floor; and a first load detection sensor attached to the base and configured to detect a load applied to the conveyance seat, wherein the seat cushion frame includes a pair of side frames separated from each other in a width direction of the conveyance seat, the first link member r includes a first rotation shaft configured to be rotatable with respect to the seat cushion frame and a second rotation shaft configured to be rotatable with respect to the base, and the first load detection sensor is arranged at a position different from the second rotation shaft in a front to back direction of the conveyance seat.

In the conveyance seat according to the aspect of the present invention configured as described above, since the second rotation shaft of the first link member provided in a height adjustment mechanism is arranged at a position different from the first load detection sensor in the front to back direction of the seat, the conveyance seat is preventing from being increased in size in a height direction.

In the conveyance seat described above, the first load detection sensor may include a first sensor shaft to which the load applied to the conveyance seat is applied, and at least a part of the second rotation shaft may be arranged at the same height position as the first sensor shaft in an up to down direction of the conveyance seat.

In the configuration described above, since the second rotation shaft of the first link member and the first sensor shaft are arranged at the same height position, the conveyance seat is prevented from being increased in size in the height direction.

In the conveyance seat described above, an upper end of the second rotation shaft may be arranged below an upper end of the first sensor shaft in the up to down direction of the conveyance seat.

In the configuration described above, since the upper end of the second rotation shaft of the first link member is arranged below the upper end of the first sensor shaft, the conveyance seat is prevented from being increased in size in the height direction.

In the conveyance seat described above, the seat cushion frame may include a connecting member connecting the pair of side frames, and when the seat cushion is located at the lowest position, at least a part of the first load detection sensor may be arranged at the same height position as the connecting member in the up to down direction of the conveyance seat.

In the configuration described above, since the connecting member and the first load detection sensor are arranged at the same height position, the conveyance seat is prevented from being increased in size in the height direction.

In the conveyance seat described above, the conveyance seat may further include a second link member configured to adjust the height of the seat cushion with respect to the base at a position rearward of the first link member, wherein each of the side frames may be arranged between the first link member and the second link member in the width direction of the conveyance seat, and the first sensor shaft may be arranged between the first link member and the second link member in the width direction of the conveyance seat.

In the configuration described above, since the first sensor shaft is arranged between the first link member and the second link member in the seat width direction, the conveyance seat is prevented from being increased in size in the width direction.

In the conveyance seat described above, the conveyance seat may further include a second load detection sensor attached to the base and configured to detect the load applied to the conveyance seat, at a position rearward of the first load detection sensor, wherein the second load detection sensor may include a second sensor shaft to which the load applied to the conveyance seat is applied, and the second sensor shaft may be arranged between the first link member and the second link member in the width direction of the conveyance seat.

In the configuration described above, since the second sensor shaft is arranged between the first link member and the second link member in the seat width direction, the conveyance seat is prevented from being increased in size in the width direction.

In the conveyance seat described above, the conveyance seat may further include a second link member configured to adjust the height of the seat cushion with respect to the base at a position rearward of the first link member, and a second load detection sensor attached to the base and configured to detect the load applied to the conveyance seat, at a position rearward of the first load detection sensor, wherein the second load detection sensor may include a coupler for connecting to an external electronic device, and the second link member may be arranged between each of the side frames and the coupler in the width direction of the conveyance seat.

In the configuration described above, since the second link member is arranged between each of the side frames and the coupler in the seat width direction, the conveyance seat is prevented from being increased in size in the width direction.

In the conveyance seat described above, the coupler may be arranged at the same position as the second link member in the front to back direction of the conveyance seat.

In the configuration described above, the second link member and the coupler are compactly arranged in the front to back direction of the seat.

In the conveyance seat described above, the conveyance seat may further include a second link member configured to adjust the height of the seat cushion with respect to the base at a position rearward of the first link member, and a second load detection sensor attached to the base and configured to detect the load applied to the conveyance seat, at a position rearward of the first load detection sensor, wherein the first link member and the second link member may be attached to a link support bracket, the first load detection sensor and the second load detection sensor may be attached to the link support bracket, and the link support bracket may be bent upward and is separated from the base between an attachment position of the first load detection sensor and an attachment position of the second load detection sensor.

In the configuration described above, the number of components constituting the conveyance seat is reduced, and the rigidity of the link support bracket itself is increased.

In the conveyance seat described above, the conveyance seat may further include a plate-shaped pressure receiving member suspended on the seat cushion frame, a recessed portion recessed inward and formed at a side portion of the pressure receiving member in the width direction of the conveyance seat, and a second load detection sensor attached to the base and configured to detect the load applied to the conveyance seat, at a position rearward of the first load detection sensor, wherein the recessed portion may be arranged between the first load detection sensor and the second load detection sensor in the front to back direction of the conveyance seat.

In the configuration described above, since the recess of the pressure receiving member is compactly arranged in the front to back direction of the seat, the rigidity of the pressure receiving member is prevented from being reduced.

According to a conveyance seat of the present invention, since the second rotation shaft of the first link member provided in a height adjustment mechanism is arranged at a position different from the first load detection sensor in the front to back direction of the seat, the conveyance seat is preventing from being increased in size in a height direction.

Further, according to a conveyance seat of the present invention, since the second rotation shaft of the first link member and the first sensor shaft are arranged at the same height position, the conveyance seat is prevented from being increased in size in the height direction.

Further, according to a conveyance seat of the present invention, since the upper end of the second rotation shaft of the first link member is arranged below the upper end of the first sensor shaft, the conveyance seat is prevented from being increased in size in the height direction.

Further, according to a conveyance seat of the present invention, since the connecting member and the first load detection sensor are arranged at the same height position, the conveyance seat is prevented from being increased in size in the height direction.

Further, according to a conveyance seat of the present invention, since the first sensor shaft is arranged between the first link member and the second link member in the seat width direction, the conveyance seat is prevented from being increased in size in the width direction.

Further, according to a conveyance seat of the present invention, since the second sensor shaft is arranged between the first link member and the second link member in the seat width direction, the conveyance seat is prevented from being increased in size in the width direction.

Further, according to a conveyance seat of the present invention, since the second link member is arranged between each of the side frames and the coupler in the seat width direction, the conveyance seat is prevented from being increased in size in the width direction.

Further, according to a conveyance seat of the present invention, the second link member and the coupler are compactly arranged in the front to back direction of the seat.

Further, according to a conveyance seat of the present invention, the number of components constituting the conveyance seat is reduced, and the rigidity of the link support bracket itself is increased.

Further, according to a conveyance seat of the present invention, since the recess of the pressure receiving member is compactly arranged in the front to back direction of the seat, the rigidity of the pressure receiving member is prevented from being reduced.

DETAILED DESCRIPTION

Hereinafter, a conveyance seat according to an embodiment of the present invention (hereinafter, the present embodiment) will be described. As an example of the conveyance seat according to the present embodiment, a vehicle seat mounted on a vehicle will be described, but the present invention is not limited to the vehicle seat.

The embodiments described below are merely examples for facilitating the understanding of the present invention, and do not limit the present invention. That is, the shapes, dimensions, arrangements, and the like of the members described below can be changed and improved without departing from the spirit of the present invention, and the present invention, of course, includes equivalents thereof.

In the following description, the phrase "front to back direction" indicates a front to back direction of the vehicle seat, and is a direction that corresponds to the front to back direction when viewed from a seated person of the vehicle seat, that is, a traveling direction of a vehicle. Further, the phrase "seat width direction" indicates a width direction of the vehicle seat, and corresponds to a right and left direction when viewed from the seated person of the vehicle seat. The phrase "height direction" indicates a height direction of the vehicle seat, and corresponds to a direction perpendicular to both the front to back direction and the seat width direction, that is, an up to down direction.

Basic Configuration of Vehicle Seat S

Figure 1:
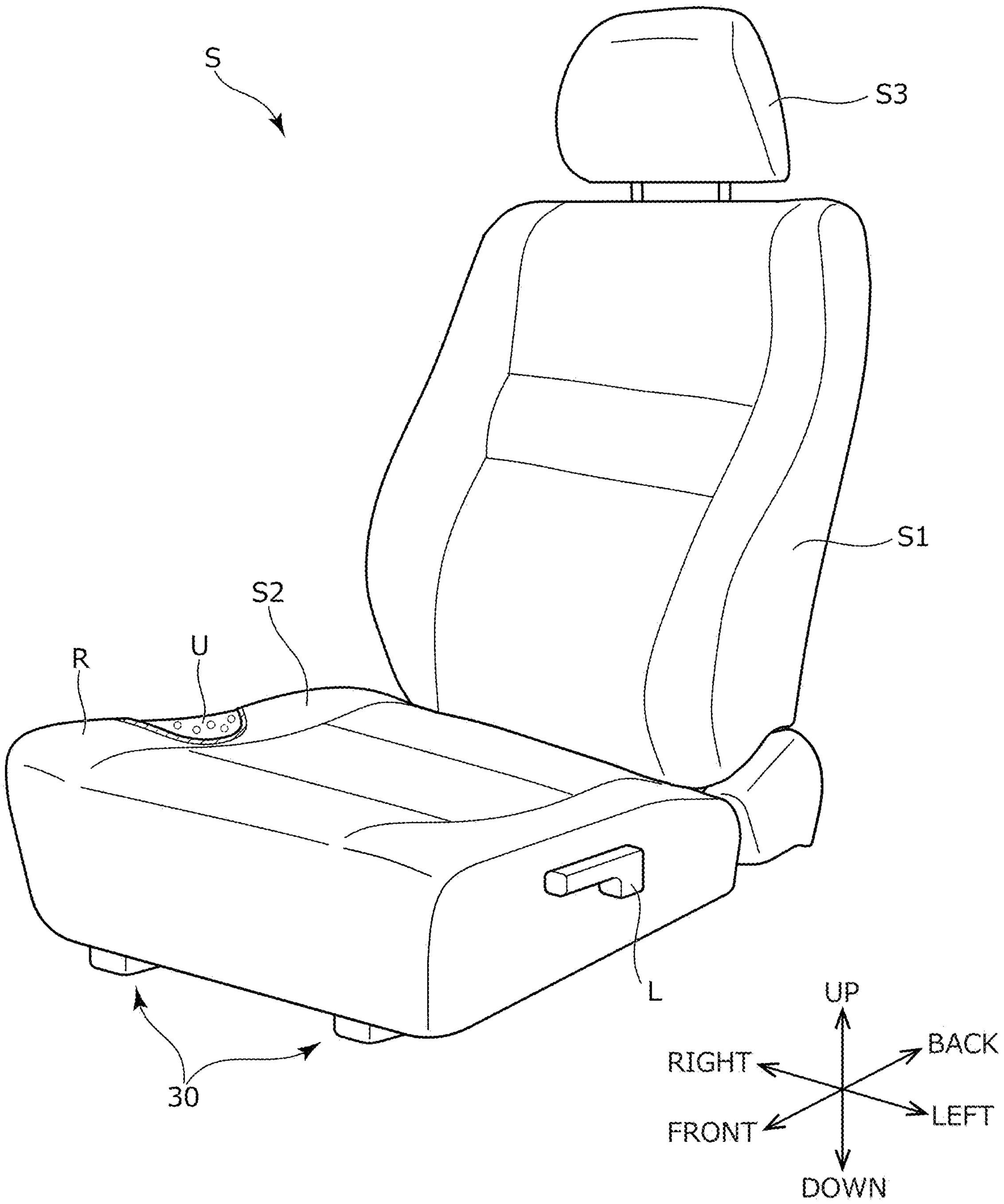
FIG. 1 is an external view of a vehicle seat according to an embodiment of the present invention.

The basic configuration of a vehicle seat S according to the present embodiment will be described. The basic configuration of the vehicle seat S according to the present embodiment is substantially the same as that of a known general vehicle seat, and includes a seat back S1, a seat cushion S2, and a headrest S3 as shown in FIG. 1. In FIG. 1, the configuration of a part of the vehicle seat S, specifically, the right center portion of the seat cushion S2 is shown with a skin material R removed for convenience of description.

Figure 2:
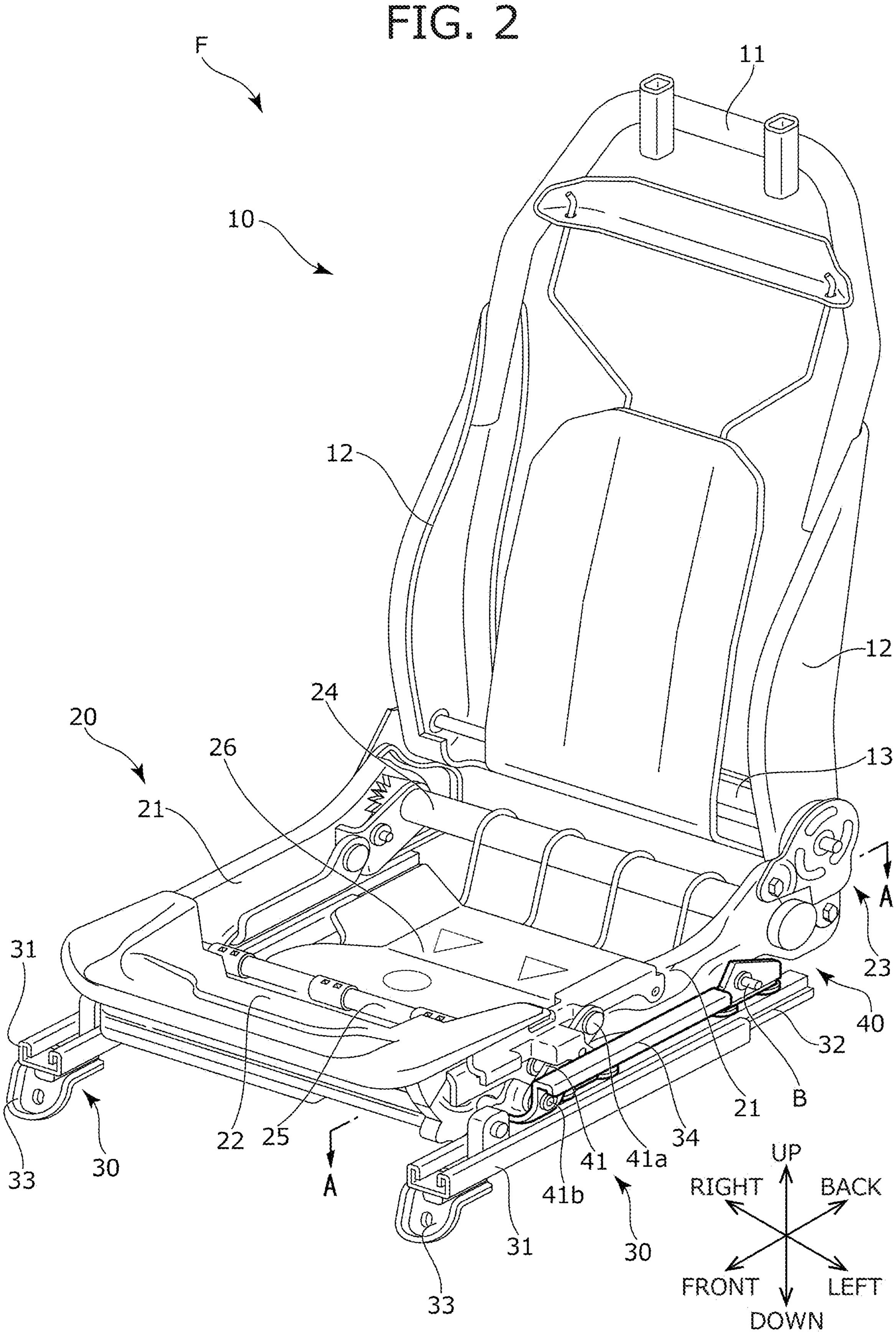
FIG. 2 is a perspective view of a seat frame provided in the vehicle seat according to the embodiment of the present invention.

The vehicle seat S includes a seat frame F as its framework shown in FIG. 2. The seat frame F includes a seat back frame 10 and a seat cushion frame 20 as main components. The seat back S1 and the seat cushion S2 are configured such that cushion pads U made of urethane or the like are placed on respective frames (the seat back frame 10 and the seat cushion frame 20) and surfaces of the cushion pads U are covered with the skin material R.

Further, slide rail mechanisms 30 for sliding the seat back S1, the seat cushion S2, and the headrest S3 in the front to back direction are arranged below the seat cushion S2. As shown in FIG. 1, a pair of right and left slide rail mechanisms 30 is provided with a gap therebetween. As shown in FIG. 2, each of the slide rail mechanisms 30 includes a lower rail 31 that is fixed to a vehicle body so as to extend in the front to back direction, and an upper rail 32 that is movable in an extending direction of the lower rail 31.

Furthermore, a height adjustment mechanism 40 for adjusting a height of the seat cushion S2 is provided between the seat cushion S2 and the slide rail mechanisms 30 in the height direction. An operating lever L for driving the height adjustment mechanism 40 is provided at the side of the seat cushion S2.

(Seat Back Frame 10)

As shown in FIG. 2, the seat back frame 10 includes an inverted U-shaped upper frame 11, a pair of right and left seat back side frames 12 forming opposite end portions in the seat width direction, and a lower member frame 13 disposed between lower end portions of the seat back side frames 12. A reclining mechanism (not shown) that adjusts an inclination angle of the seat back S1 with respect to the seat cushion S2 is attached to the lower end portion of one seat back side frame 12 of the pair of right and left seat back side frames 12.

(Seat Cushion Frame 20)

As shown in FIG. 2, the seat cushion frame 20 has a rectangular frame-shaped outer shape when viewed from above, and includes seat cushion side frames 21 (corresponding to side frames) located at opposite end portions in the seat width direction, and a pan frame 22 constituting a front end portion of the seat cushion frame 20 as main components. Further, connecting brackets 23 are attached to upper portions of the rear end portions of the seat cushion side frames 21. The connecting brackets 23 are metal plate members provided to connect the seat cushion side frames 21 and the seat back side frames 12.

Each of the seat cushion side frames 21 is made of metal steel plate extending in the front to back direction. Further, each of the seat cushion side frames 21 is located directly above the corresponding slide rail mechanism 30 (the slide rail mechanism 30 located closer to the each of the seat cushion side frames 21).

As shown in FIG. 2, the rear end portions of the pair of right and left seat cushion side frames 21 are connected to each other through a rear side connecting pipe 24. The rear side connecting pipe 24 is formed of a round pipe extending in the seat width direction. Furthermore, as shown in FIG. 2, the front end portions of the pair of right and left seat cushion side frames 21 are connected to each other through a front side connecting pipe 25. The front side connecting pipe 25 is formed of a round pipe extending in the seat width direction.

Each of the rear side connecting pipe 24 and the front side connecting pipe 25 is arranged between the seat cushion side frames 21, and the end portions thereof are joined to the seat cushion side frames 21 so as to extend through the seat cushion side frames 21.

Figure 3:
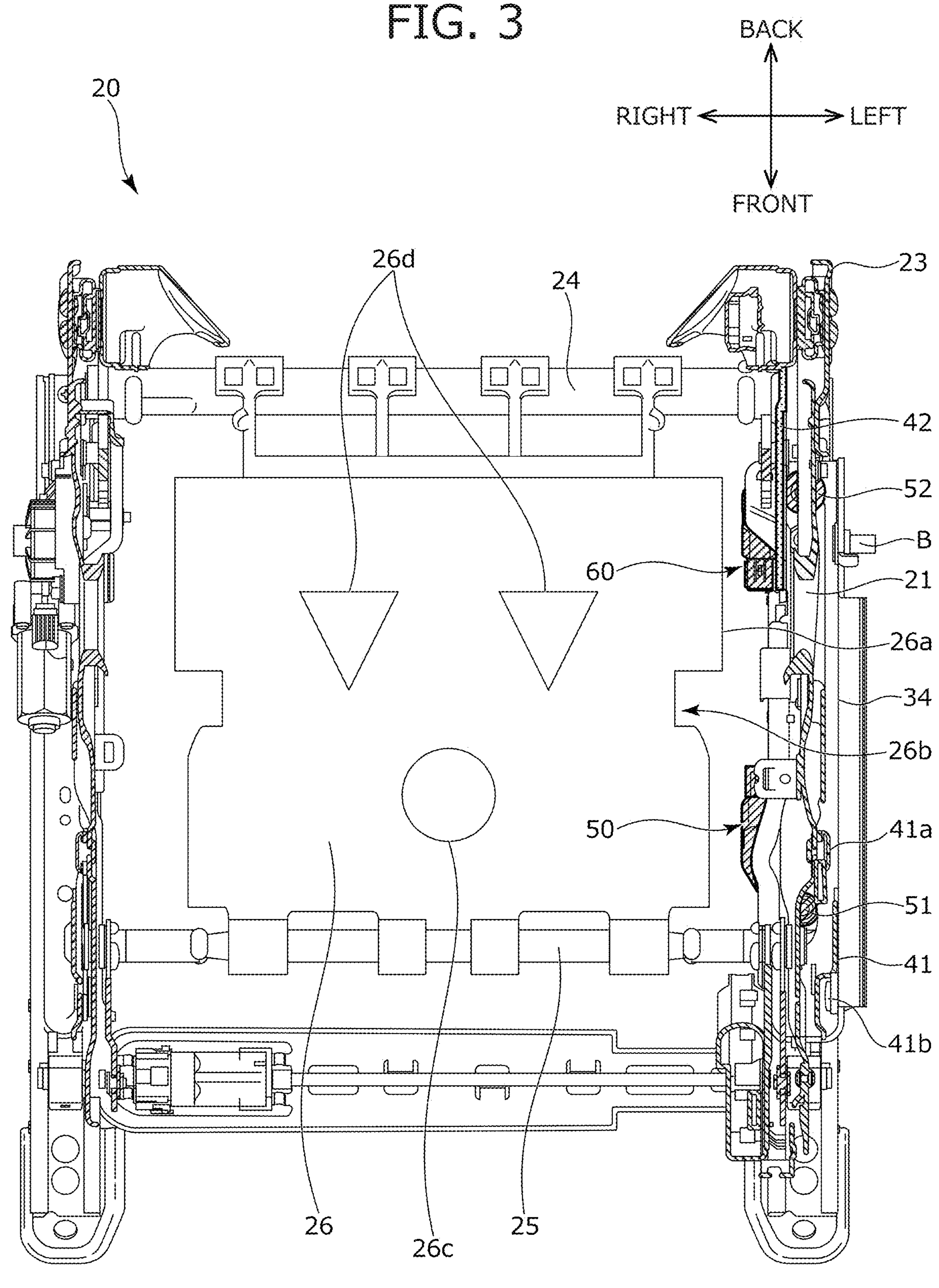
FIG. 3 is a partial cross-sectional view of a seat cushion frame of the vehicle seat when viewed from above.

As shown in FIGS. 2 and 3, a plate-shaped pressure receiving member 26 is suspended between the rear side connecting pipe 24 and the front side connecting pipe 25 of the seat cushion frame 20. In the pressure receiving member 26, a recessed portion 26*b* recessed inward is formed at a side portion 26*a* in the seat width direction. As shown in FIG. 3, in a front part of the pressure receiving member 26, one round hole 26*c* is formed at a substantially central position in the seat width direction. Further, in a rear part of the pressure receiving member 26, two triangular holes 26*d* are formed side by side in the seat width direction. Instead of the pressure receiving member 26, the pan frame 22 may extend to the rear side connecting pipe 24.

(Slide Rail Mechanism 30)

Figure 4:
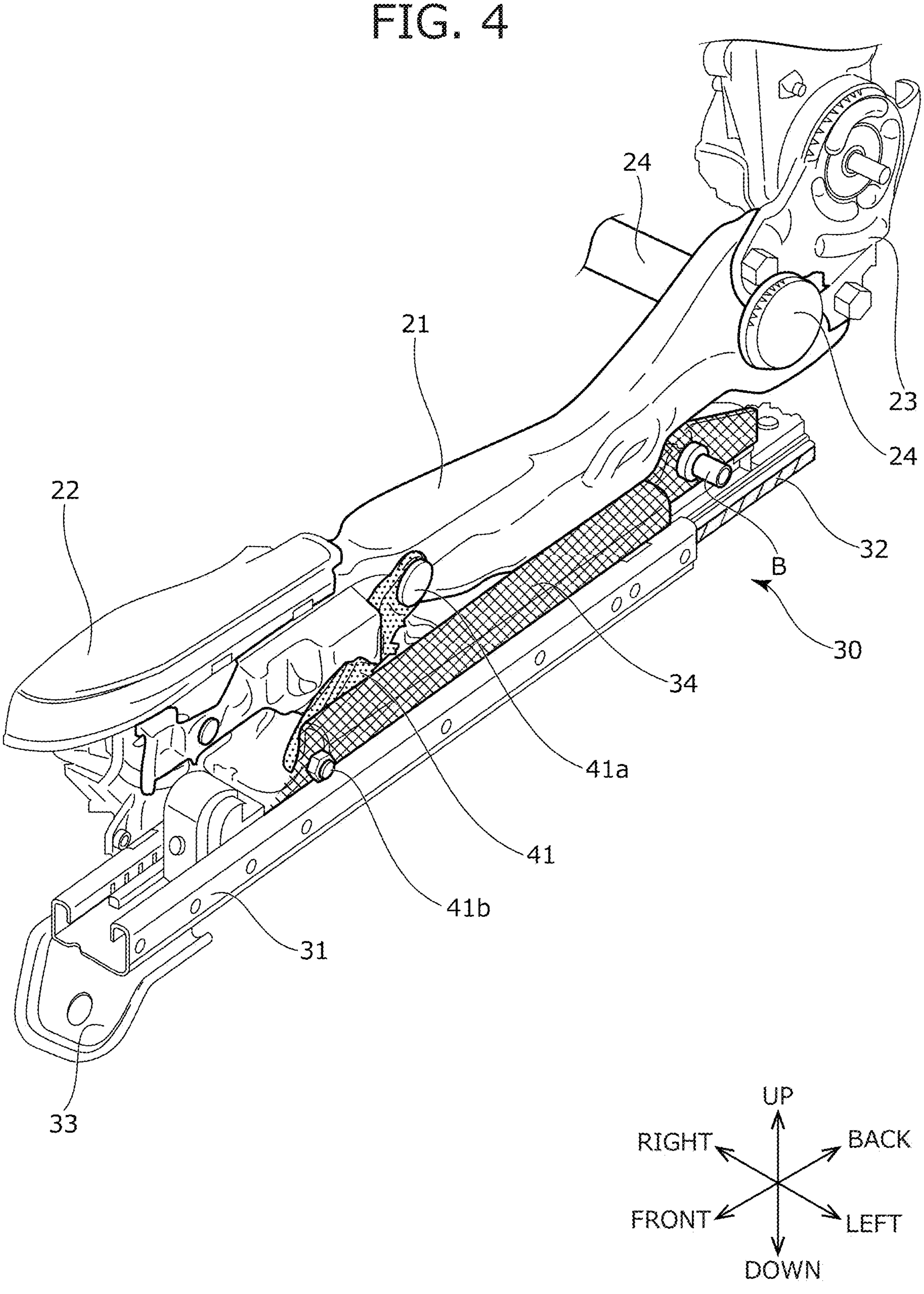
FIG. 4 is a schematic perspective view of the seat cushion frame of the vehicle seat when viewed from the outside.
Figure 5:
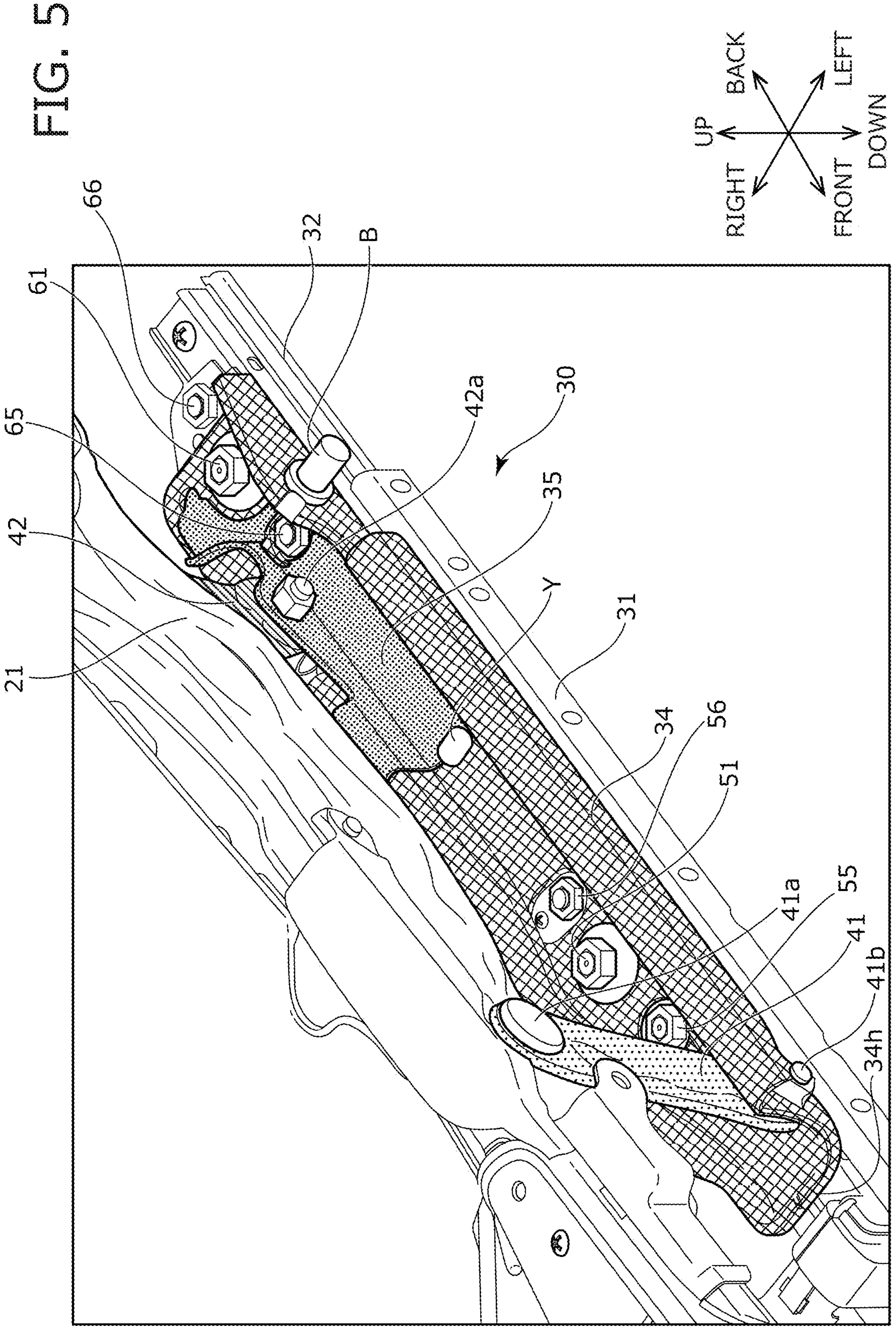
FIG. 5 is an enlarged view showing a slide rail of the vehicle seat and its vicinity.

The slide rail mechanism 30 includes the lower rail 31 and the upper rail 32, as well as, a foot 33, a first link support bracket 34, and a second link support bracket 35 (FIGS. 4 and 5). The foot 33 is a member attached to a front end portion of the lower rail 31 in order to fix the lower rail 31 to the vehicle body.

A pair of right and left first link support brackets 34 and a pair of right and left second link support brackets 35, which serve as link support brackets, are each provided so as to be separated from each other in the seat width direction, and are metal plate members that support rotation links (specifically, front links 41 and rear links 42 to be described later) provided in the height adjustment mechanism 40 (FIGS. 4 to 7B).

(First Link Support Bracket 34)

Figure 6A:
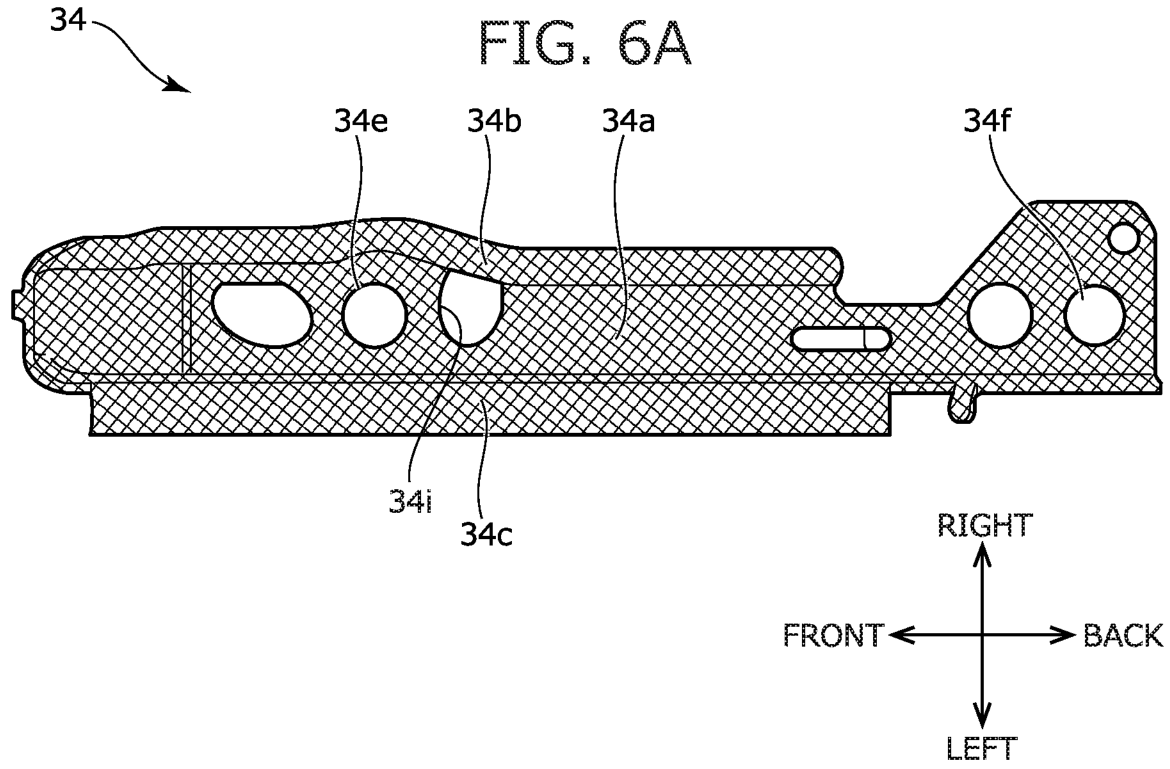
FIG. 6A is a top view of a first link support bracket.
Figure 6B:
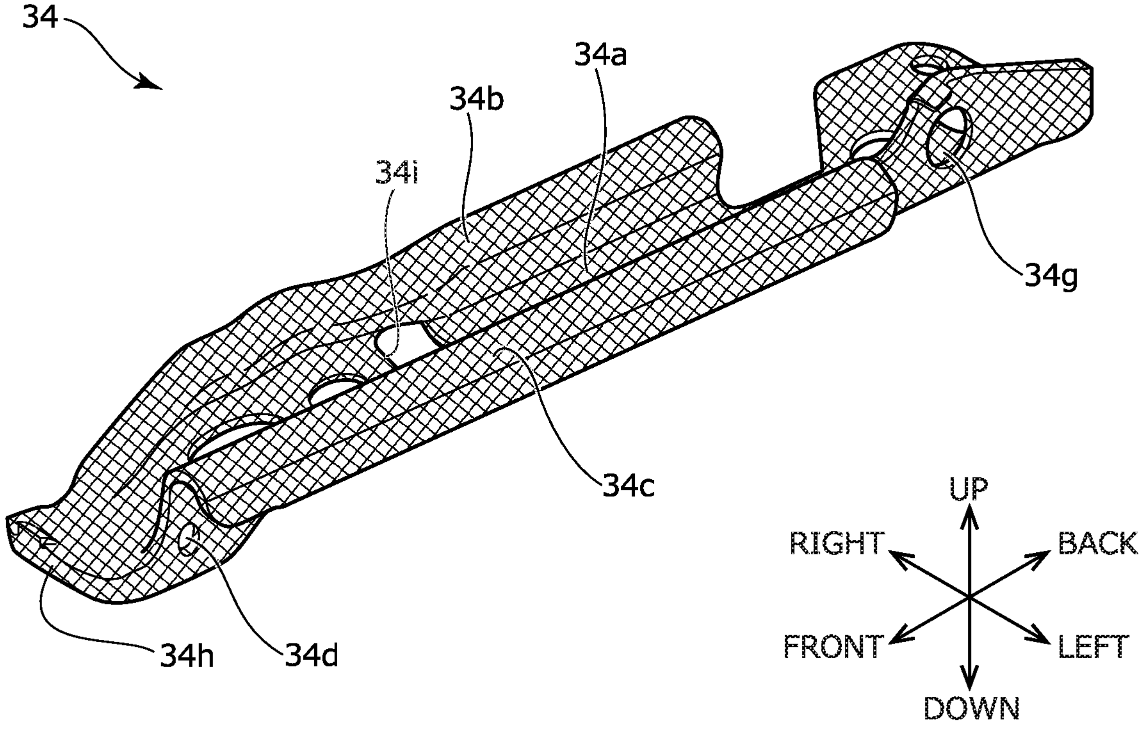
FIG. 6B is a perspective view of the first link support bracket.

The first link support bracket 34 extends long in the front to back direction and is fixed to an upper surface of the upper rail 32 via a front load detection sensor 50 and a rear load detection sensor 60. As shown in FIGS. 5, 6A and 6B, the first link support bracket 34 includes a bottom wall 34*a* to which the front load detection sensor 50 and the rear load detection sensor 60 are attached, and an inner wall 34*b* and an outer wall 34*c* that are provided to stand from the bottom wall 34*a*.

As shown in FIG. 6B, the inner wall 34*b* of the first link support bracket 34 is bent inward in the seat width direction. Further, as shown in FIGS. 5 and 6B, the outer wall 34*c* of the first link support bracket 34 is bent in an inverted U shape outward in the seat width direction. Further, a front link hole 34*d* is formed at a front end portion of the outer wall 34*c* of the first link support bracket 34 so as to correspond to a second rotation shaft 41*b* at a lower end portion of the front link 41 to be described later.

A first shaft hole 34*e* is formed in a front part of the bottom wall 34*a* of the first link support bracket 34 so as to correspond to a first sensor shaft 51 of the front load detection sensor 50 to be described later. Further, a second shaft hole 34*f* is formed in a rear part of the bottom wall 34*a* of the first link support bracket 34 so as to correspond to a second sensor shaft 61 of the rear load detection sensor 60 to be described later (FIGS. 5 and 6A). Further, a rear hole 34*g* is formed at a rear end portion of the outer wall 34*c* of the first link support bracket 34 so as to correspond to a buckle support bracket attachment portion B of a seat belt to be described later.

(Second Link Support Bracket 35)

Figure 7A:
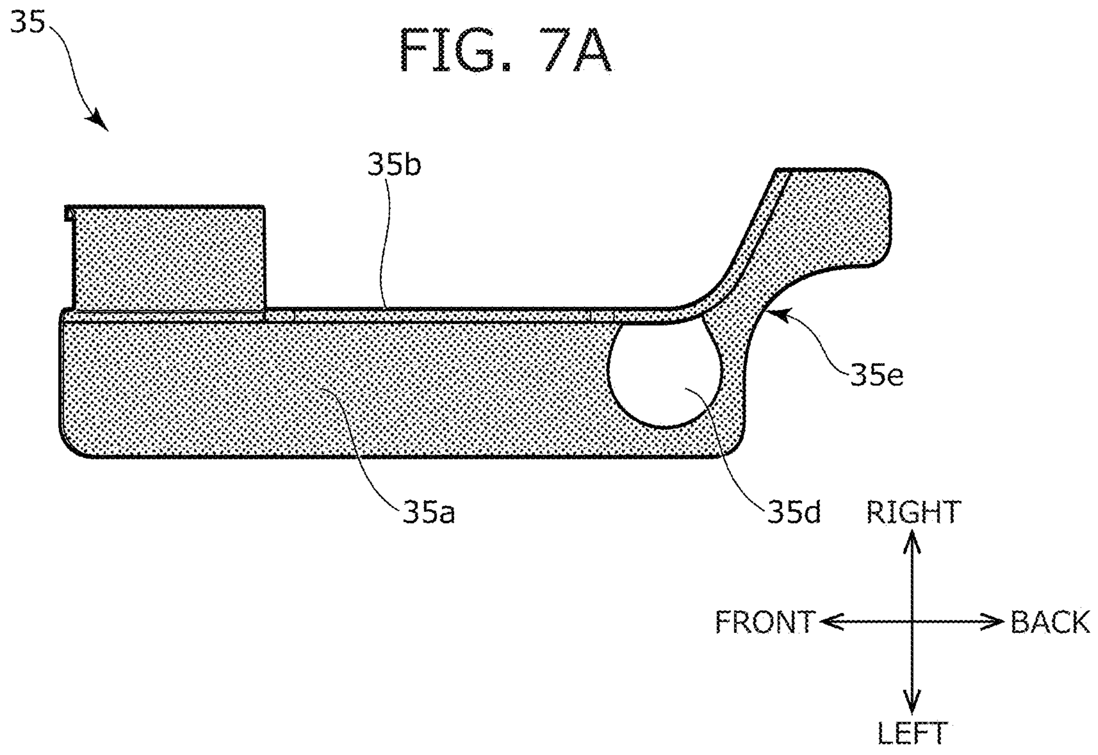
FIG. 7A is a top view of a second link support bracket.
Figure 7B:
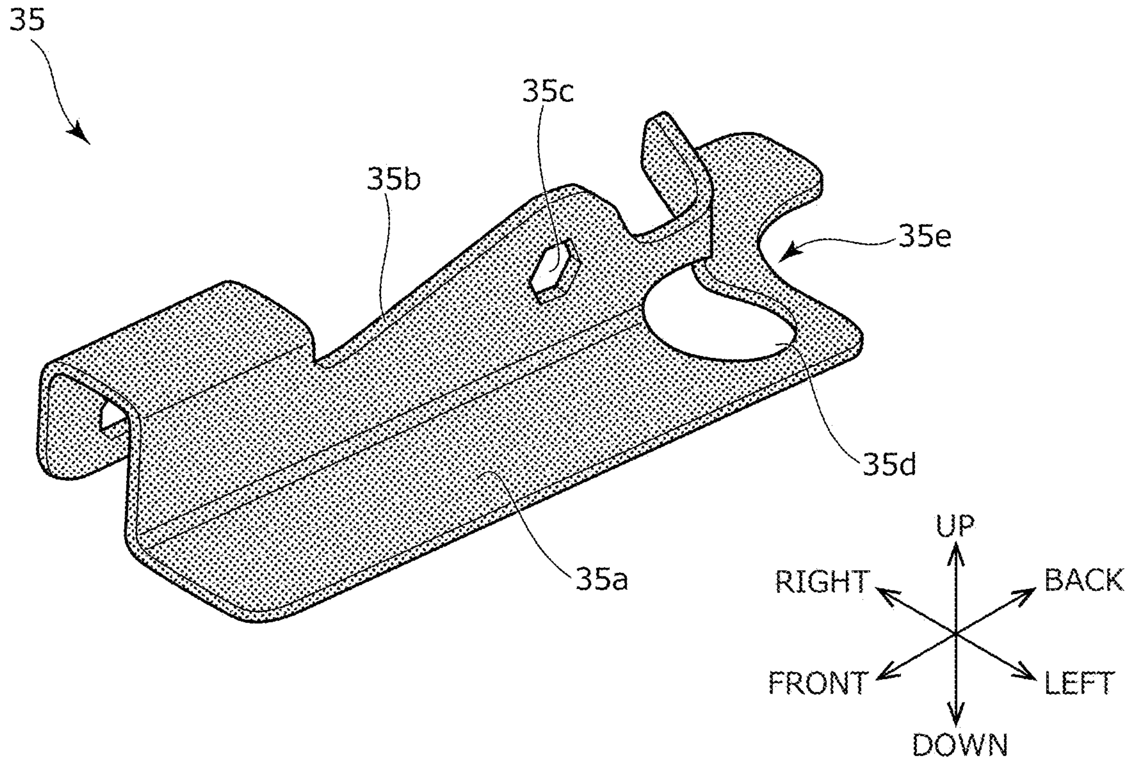
FIG. 7B is a perspective view of the second link support bracket.

The second link support bracket 35 is arranged at a rear end of the first link support bracket 34, and is fixed to the upper surface of the upper rail 32 via the rear load detection sensor 60. As shown in FIGS. 5, 7A and 7B, the second link support bracket 35 includes a bottom wall 35*a* to which the rear load detection sensor 60 is attached, and an inner wall 35*b* provided to stand from the bottom wall 35*a*.

As shown in FIG. 7B, a front portion of the inner wall 35*b* of the second link support bracket 35 is bent inward in the seat width direction and is fitted to the inner wall 34*b* of the first link support bracket 34. Further, as shown in FIG. 7B, a rear link hole 35*c* is formed in a rear part of the inner wall 35*b* of the second link support bracket 35 so as to correspond to a rear link rotation shaft 42*a* of the rear link 42 to be described later.

A nut hole 35*d* is formed in the bottom wall 35*a* of the second link support bracket 35 so as to correspond to a nut at a front part of the rear load detection sensor 60 to be described later (FIGS. 5, 7A, and 7B). Further, at a rear end portion of the bottom wall 35*a* of the second link support bracket 35, a notched portion 35*e* is formed to be recessed inward in the seat width direction so as to correspond to the second sensor shaft 61 of the rear load detection sensor 60 to be described later.

Figure 10A:
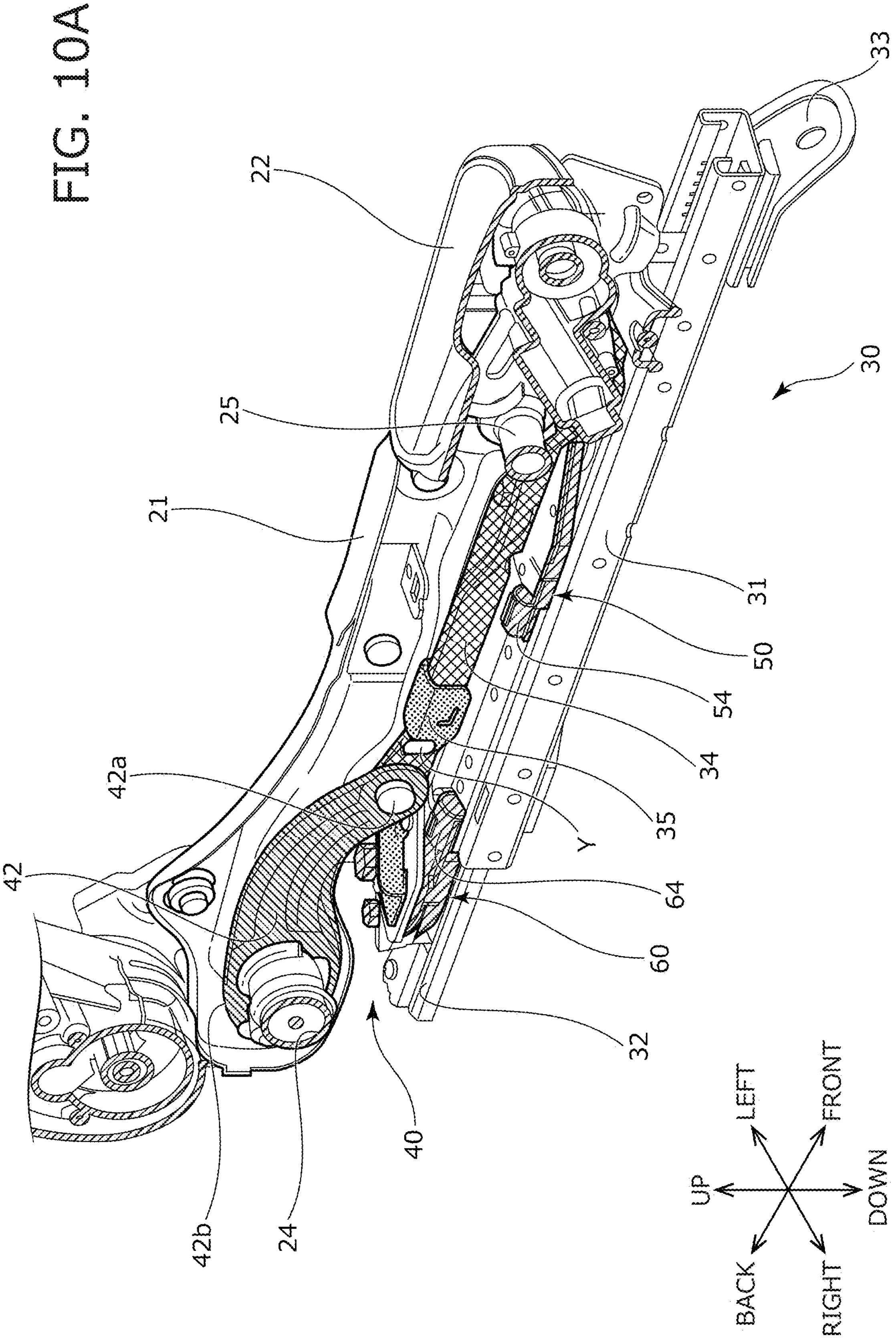
FIG. 10A is a schematic perspective view of the seat cushion frame of the vehicle seat when viewed from the inside.
Figure 10B:
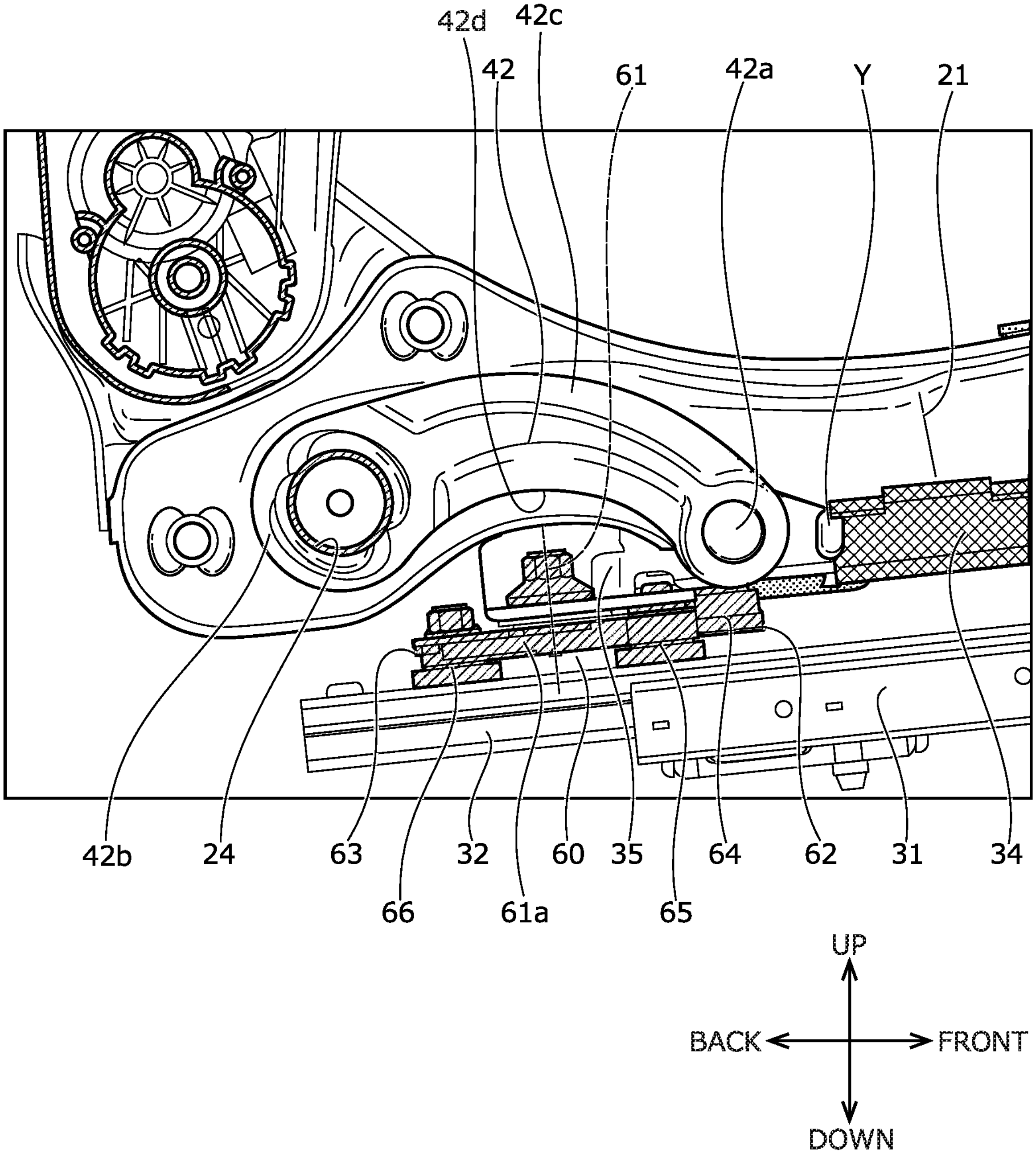
FIG. 10B is a side view showing a rear end portion of the seat cushion frame of the vehicle seat.
Figure 11A:
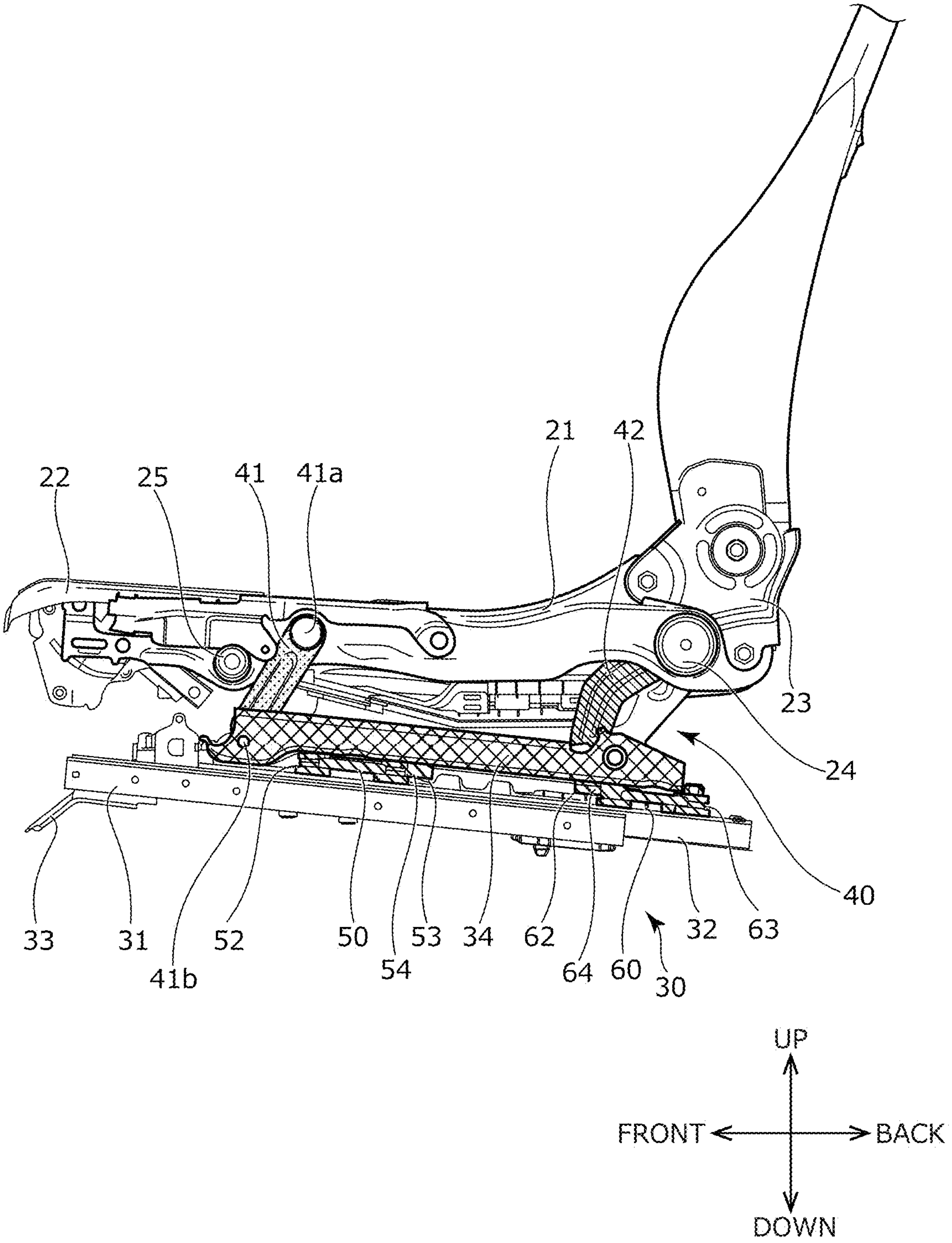
FIG. 11A is a side view of the seat frame when a seat cushion of the vehicle seat is located at the uppermost position.
Figure 11B:
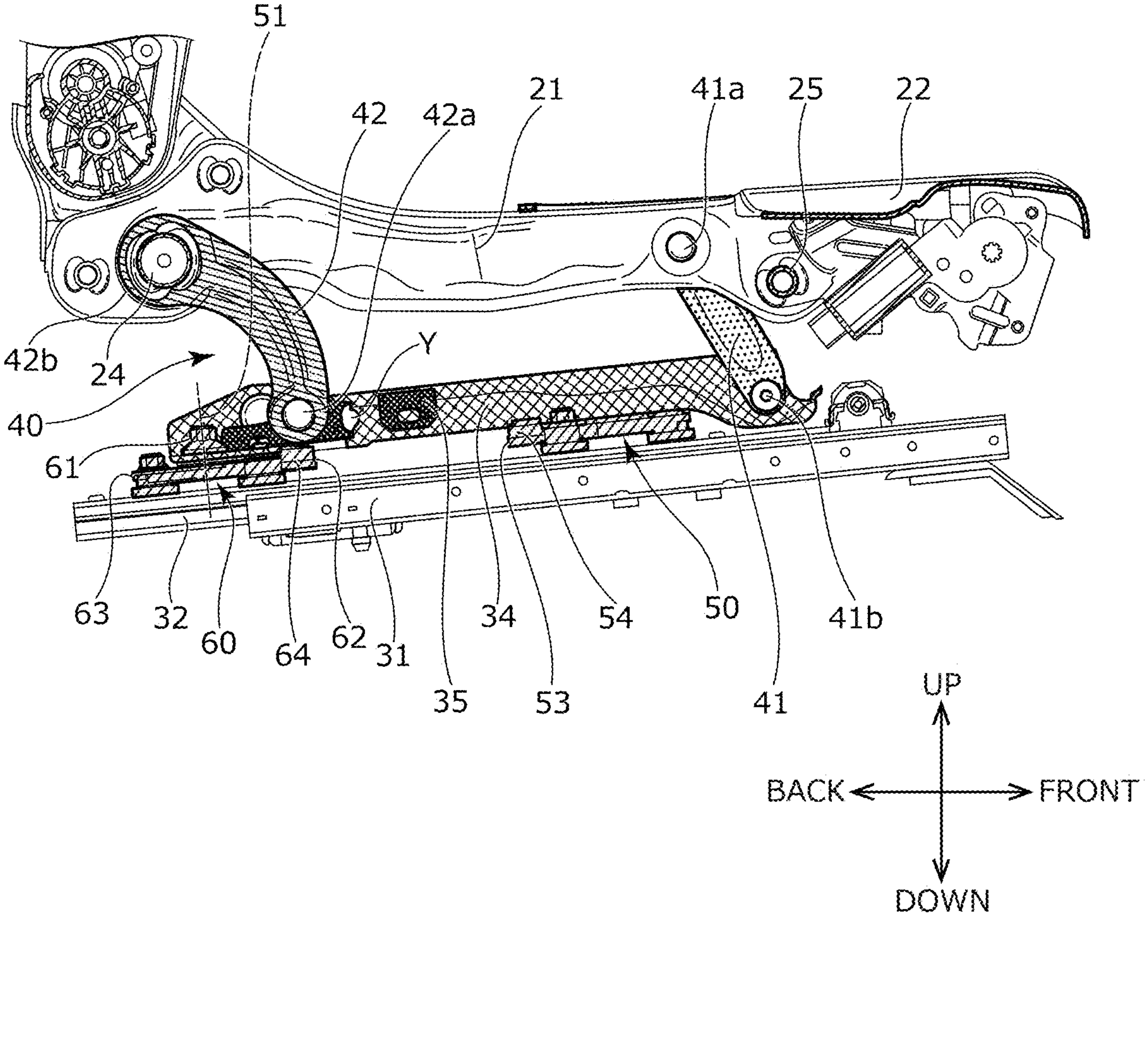
FIG. 11B is a schematic side view of the seat frame when the seat cushion of the vehicle seat is located at the uppermost position, when viewed from the inside.
Figure 12A:
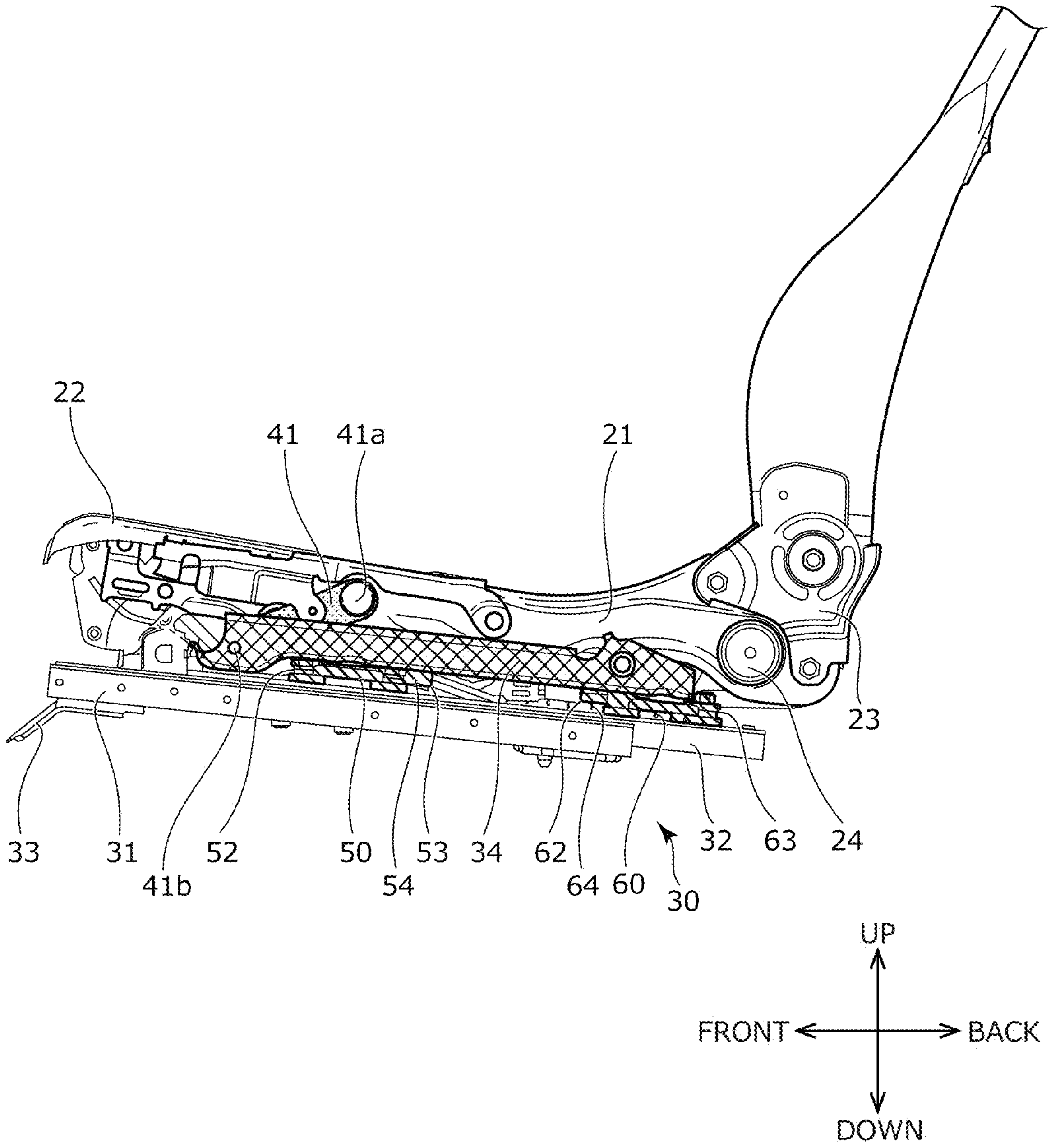
FIG. 12A is a side view of the seat frame when the seat cushion of the vehicle seat is located at the lowermost position.
Figure 12B:
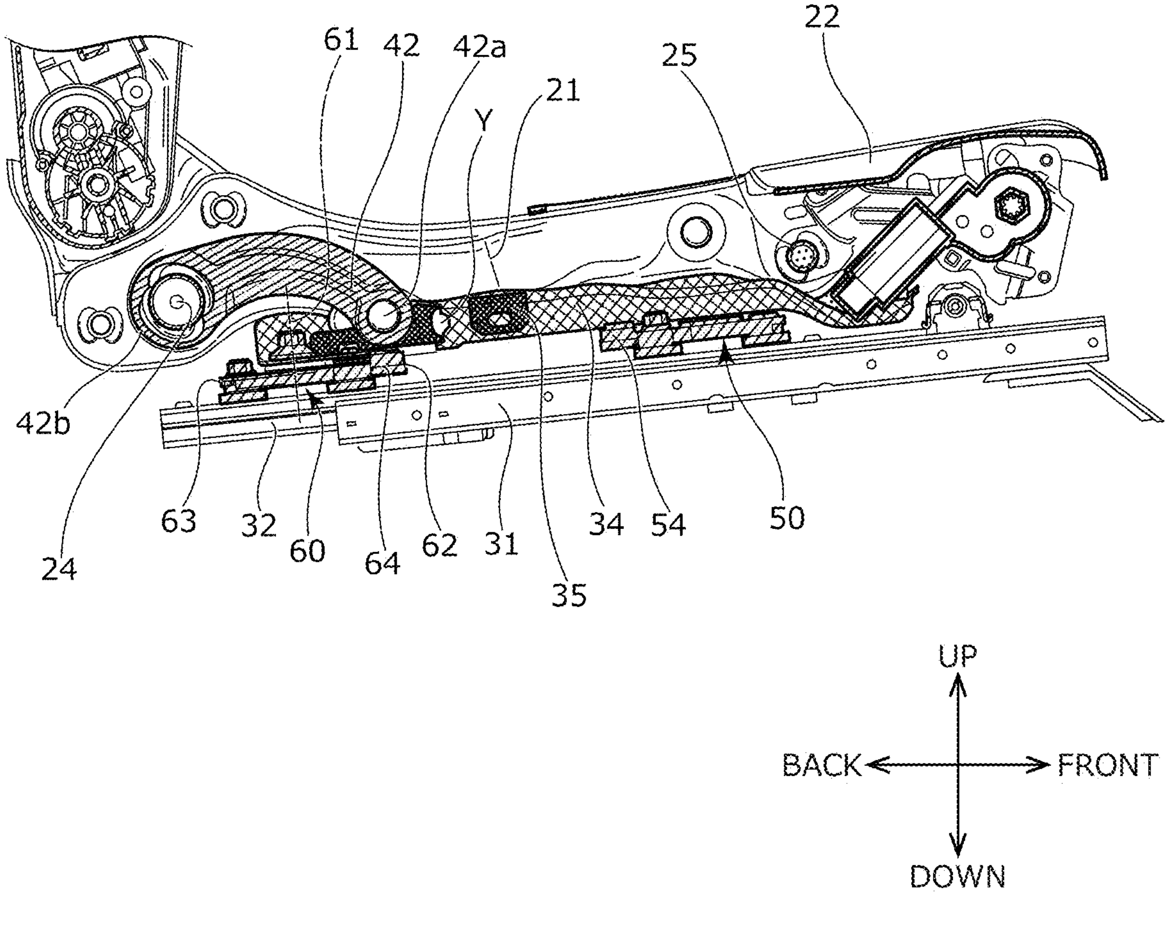
FIG. 12B is a schematic side view of the seat frame when the seat cushion of the vehicle seat is located at the lowermost position, when viewed from the inside.
Figure 13:
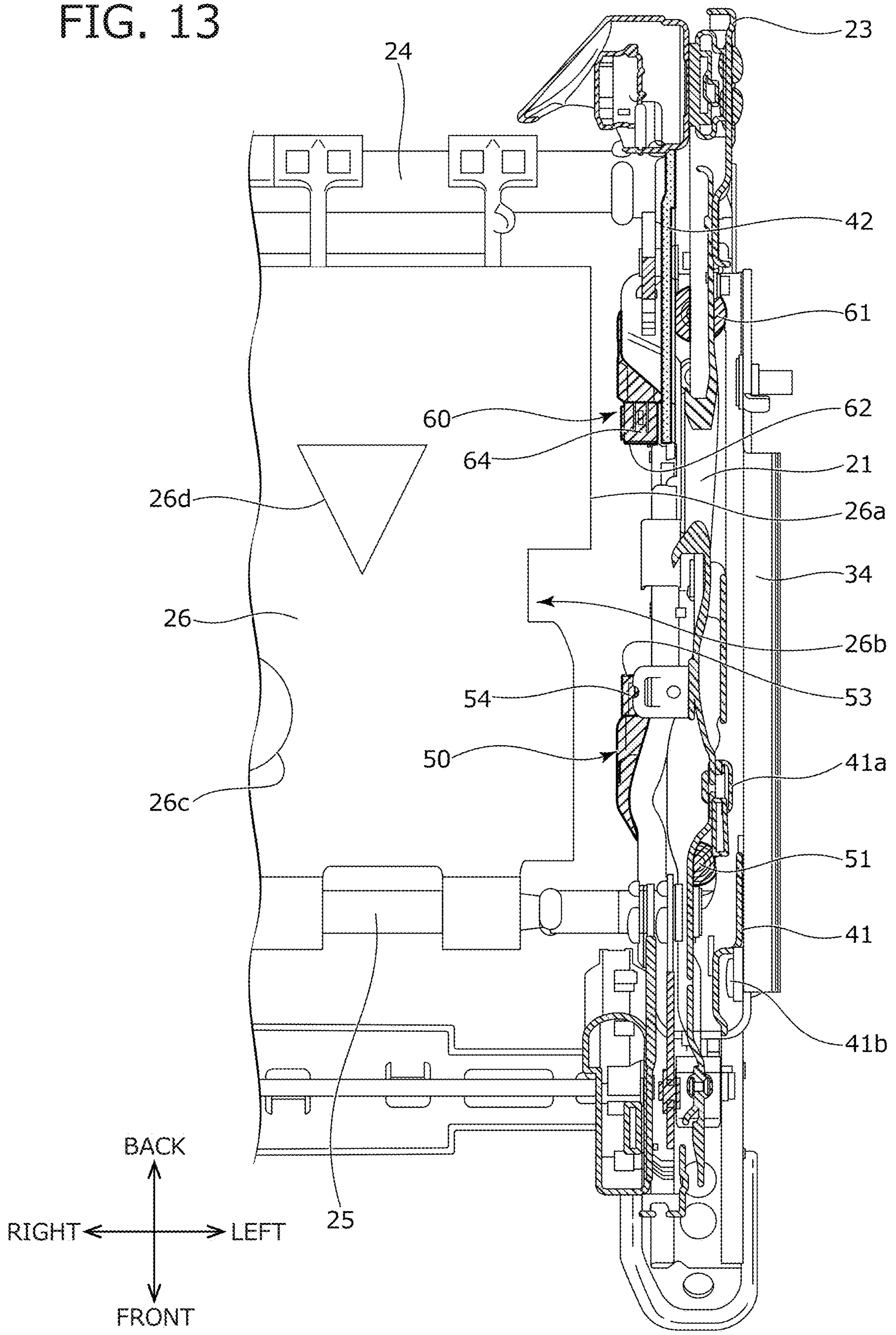
FIG. 13 is a partial cross-sectional view of the seat cushion frame of the vehicle seat when viewed from above.

The bottom wall 35*a* of the second link support bracket 35 is overlapped on the bottom wall 34*a* of the first link support bracket 34 to be welded at a welded portion Y (FIGS. 5, 10A and 10B).

(Height Adjustment Mechanism 40)

The height adjustment mechanism 40 adjusts the height of the seat cushion S2 by rotation of the rotation links. Two rotation links are arranged on each of the right and left sides. Specifically, two rotation links are arranged above each of the pair of right and left slide rail mechanisms 30. The two rotation links are separated from each other in the front to back direction (that is, the extending direction of the lower rail 31).

Front rotation links correspond to first link members, and are referred to as the front links 41 below. Rotation links located rearward of the front rotation links correspond to second link members, and are referred to as the rear links 42 below. The front links 41 are positioned closer to the front side connecting pipe 25 than the rear links 42 in the front to back direction. In other words, the front side connecting pipe 25 is positioned closer to the front links 41 than the rear links 42.

Figure 9:
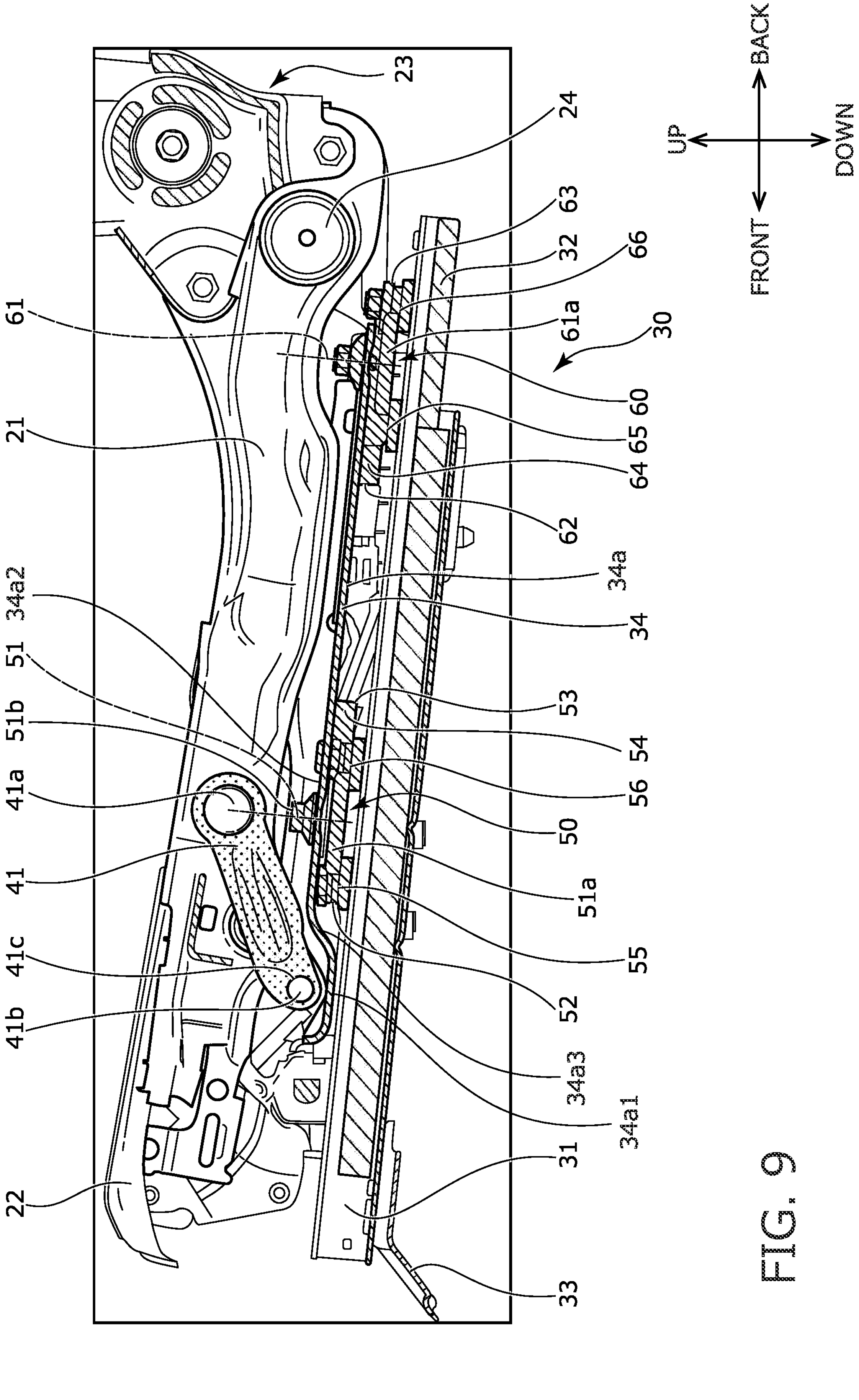
FIG. 9 is a cross-sectional view taken along the line A-A of FIG. 2.

Each of the rotation links is made of metal plate material and is pressed into a predetermined shape. Ribs recessed inward in the seat width direction are formed on the surfaces of the front links 41 so as to extend between first rotation shafts 41*a* and the second rotation shafts 41*b* (FIG. 9). Further, ribs recessed outward in the seat width direction are formed on the surfaces of the rear links 42 so as to extend between the rear link rotation shafts 42*a* and rear end portions 42*b* (FIGS. 10A and 10B).

A configuration of the height adjustment mechanism 40 will be described below with reference to FIGS. 8 to 12B. In the height adjustment mechanism 40, both the front links 41 and the rear links 42, which are rotation links, are rotatably supported with respect to the seat cushion S2 and the upper rail 32.

Figure 8:
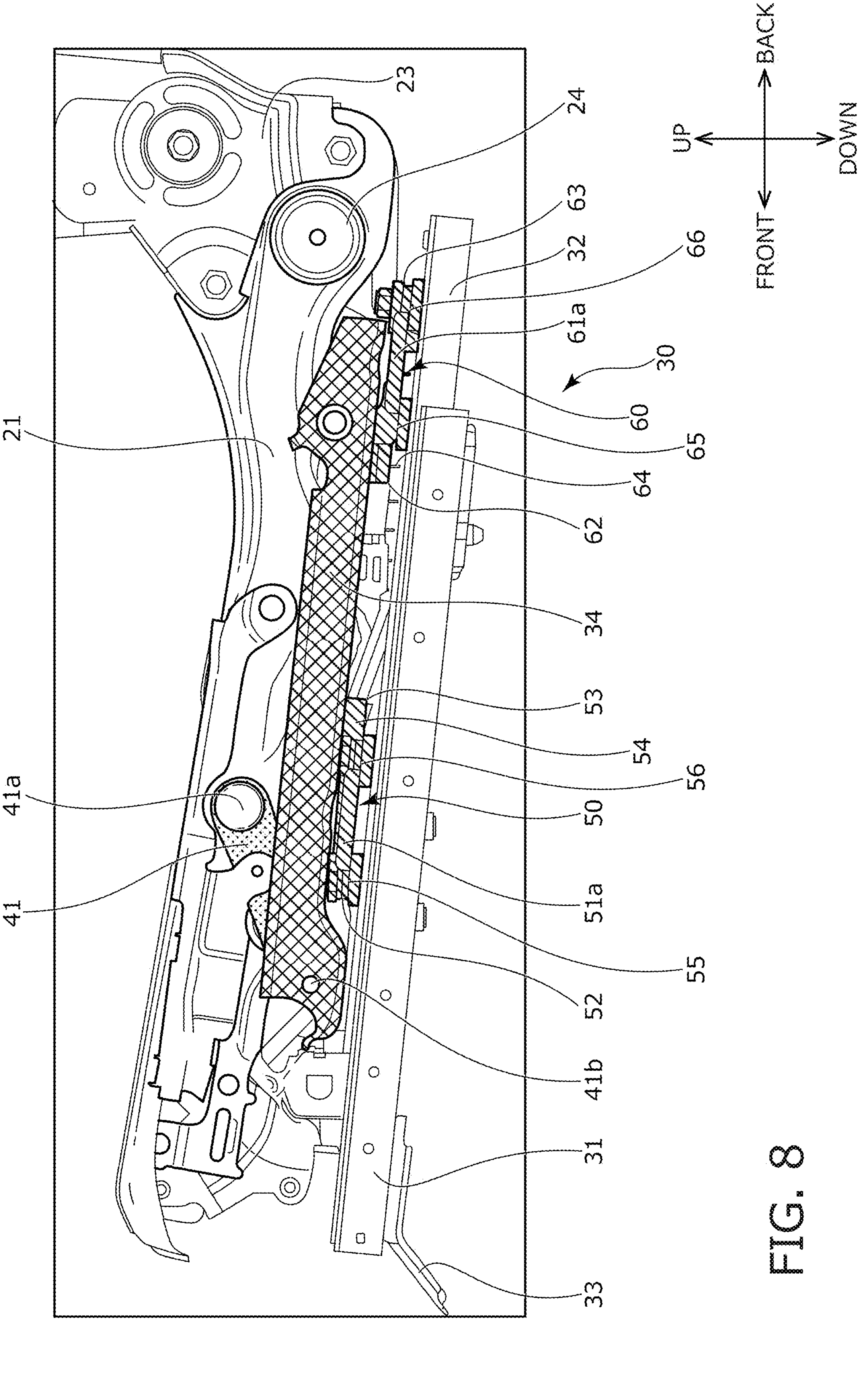
FIG. 8 is a side view of the seat cushion frame of the vehicle seat.

Specifically, the front link 41 is rotatably supported with respect to the first link support bracket 34 via a pivot pin so as to overlap with the front link hole 34*d* at the second rotation shaft 41*b* at its lower end portion (FIGS. 8 and 9).

Further, the rear link 42 is rotatably supported with respect to the second link support bracket 35 via a pivot pin so as to overlap with the rear link hole 35*c* at the rear link rotation shaft 42*a* at its lower end portion (FIGS. 10A and 10B).

In addition, an upper end portion of the front link 41 is rotatably supported at the first rotation shaft 41*a* via a pivot pin, at a portion slightly forward of the center portion of the seat cushion side frame 21 in the front to back direction of the seat (FIGS. 8 and 9). Furthermore, the rear end portion 42*b* of the rear link 42 is rotatably supported at the rear side connecting pipe 24 at the rear end portion of the seat cushion side frame 21 (FIGS. 10A and 10B).

Here, the support structure of an upper end portion of the rear link 42 will be described in detail. The upper end portion of the rear link 42 has a substantially sector in a side view as shown in FIG. 10B, and a through hole is formed in the central portion thereof. The end portion of the rear side connecting pipe 24 is fitted and welded to the through hole, as shown in FIG. 10B.

The rear side connecting pipe 24 is supported by the seat cushion side frames 21 so as to be rotatable relative to the seat cushion side frames 21. Thus, the upper end portion of the rear link 42 is rotatable relative to the seat cushion side frames 21.

In this way, the front link 41 and the rear link 42, as well as, the link support brackets (the first link support bracket 34 and the second link support bracket 35) fixed to the upper rail 32, and the seat cushion side frame 21, constitute a four-bar linkage. The front link 41 or the rear link 42 can be rotated with respect to the seat cushion side frame 21 by an electric or manual actuator (not shown) to change the height of the seat cushion S2.

Specifically, when one of the front link 41 and the rear link 42 rotates, in a manner following this, the other of the rotation links rotates in the same direction. At this time, each of the rotation links rotates so as to rotate together with the seat cushion frame 20 (in other words, rotate together with the seat cushion S2). As a result, the seat cushion frame 20 (that is, the position of the seat cushion S2) moves up and down between the uppermost position shown in FIGS. 11A and 11B and the lowermost position shown in FIGS. 12A and 12B to adjust the height of the seat cushion S2.

(Load Detection Sensor)

In the vehicle seat S of the present embodiment, a load detection sensor that detects the load applied to the vehicle seat S is attached to the upper surface of the upper rail 32 of the slide rail mechanism 30 as a base by fastening members (bolts and nuts). More specifically, the front load detection sensor 50 as a first load detection sensor is attached to a front part of the upper rail 32 by a first front side fastening member 55 and a first rear side fastening member 56, and a rear load detection sensor 60 as a second load detection sensor is attached to a rear part of the upper rail 32 by a second front side fastening member 65 and a second rear side fastening member 66. The front load detection sensor 50 and the rear load detection sensor 60 are conventionally known strain sensors.

The front load detection sensor 50 and the rear load detection sensor 60 may be provided on at least one of a pair of upper rails 32 separated from each other in the seat width direction. When the vehicle seat S does not include the slide rail mechanisms 30, the front load detection sensor 50 and the rear load detection sensor 60 are directly attached to a vehicle body floor (not shown) as a base.

As shown in FIG. 9, the front load detection sensor 50 includes the first sensor shaft 51, to which a load is applied from above, between a first sensor front end 52 located at the front and a first sensor rear end 53 located at the rear. The front load detection sensor 50 includes, at the first sensor rear end 53, a first coupler 54 (a sensor connector) for connecting to an external electronic device (an electronic control unit).

When the load of the occupant seated on the vehicle seat S is applied to a first flexure element 51*a*, which is a sensor substrate, via the first sensor shaft 51, deflection is generated in the first flexure element 51*a*. The front load detection sensor 50 is configured to measure the load of the occupant seated on the vehicle seat S as the deflection generated in the first flexure element 51*a*.

As shown in FIG. 9, the rear load detection sensor 60 includes a second sensor shaft 61, to which a load is applied from above, between a second sensor front end 62 located at the front and a second sensor rear end 63 located at the rear. The rear load detection sensor 60 includes, at the second sensor front end 62, a second coupler 64 (a sensor connector) for connecting to an external electronic device (an electronic control unit).

When the load of the occupant seated on the vehicle seat S is applied to a second flexure element 61*a*, which is a sensor substrate, via the second sensor shaft 61, deflection is generated in the second flexure element 61*a*. The rear load detection sensor 60 is configured to measure the load of the occupant seated on the vehicle seat S as the deflection generated in the second flexure element 61*a*.

As shown in FIGS. 5, 8 and 9, the first flexure element 51*a* is located on a lower surface of the bottom wall 34*a* of the first link support bracket 34, and an upper end portion 51*b* of the first sensor shaft 51 is exposed upward from the first shaft hole 34*e* of the bottom wall 34*a* of the first link support bracket 34. Further, the second flexure element 61*a* is located on the lower surface of the bottom wall 34*a* of the first link support bracket 34, and an upper end portion of the second sensor shaft 61 is exposed upward from the second shaft hole 34*f* of the bottom wall 34*a* of the first link support bracket 34.

With such a configuration, in the vehicle seat S according to the present embodiment, the link support brackets (the first link support brackets 34 and the second link support brackets 35) appropriately support the rotation links (the front links 41 and the rear links 42), and the load of the occupant seated on the vehicle seat S is efficiently applied to the first flexure element 51*a* via the first sensor shaft 51.

(About the Positional Relationship between Members)

In the vehicle seat S according to the present embodiment, the respective components are arranged in an appropriate positional relationship as described below, and therefore, even though the height adjustment mechanism 40 and the load detection sensor are provided, an increase in size in the height direction and the width direction is prevented.

The front load detection sensor 50 is located at a position different from the second rotation shaft 41*b* of the front link 41 in the front to back direction of the seat (FIG. 9). More specifically, the second rotation shaft 41*b* of the front link 41 is arranged forward of the first sensor front end 52 of the front load detection sensor 50 (FIG. 9). In this way, in the seat front to back direction, the second rotation shaft 41*b* of the front link 41 constituting the height adjustment mechanism 40 is arranged at a position different from the front load detection sensor 50 and does not overlap with the front load detection sensor 50, so that the vehicle seat S is prevented from being increased in size in the height direction.

Further, the first sensor shaft 51 of the front load detection sensor 50 is arranged at the same height position as at least a part of the second rotation shaft 41*b* of the front link 41 in the up to down direction of the seat (FIG. 9). Thus, since the second rotation shaft 41*b* and the first sensor shaft 51 are arranged at the same height position, the vehicle seat S is prevented from being increased in size in the height direction.

Further, as shown in FIG. 9, an upper end portion 41*c* of the second rotation shaft 41*b* of the front link 41 is arranged below the upper end portion 51*b* of the first sensor shaft 51 in the up to down direction of the seat, and the vehicle seat S is prevented from being increased in size in the height direction.

Further, as shown in FIG. 9, when the seat cushion S2 is located at the lowermost position, at least a part of the front load detection sensor 50 is arranged at the same height position as the rear side connecting pipe 24 of the seat cushion frame 20 in the up to down direction of the seat, and the vehicle seat S is prevented from being increased in size in the height direction.

Further, the seat cushion side frame 21 is arranged between the front link 41 and the rear link 42 in the seat width direction (FIGS. 9 and 10), and the first sensor shaft 51 is arranged between the front link 41 and the rear link 42 in the seat width direction. (FIGS. 3 and 5). According to such a configuration, the vehicle seat S is prevented from being increased in size in the width direction.

Figure 14:
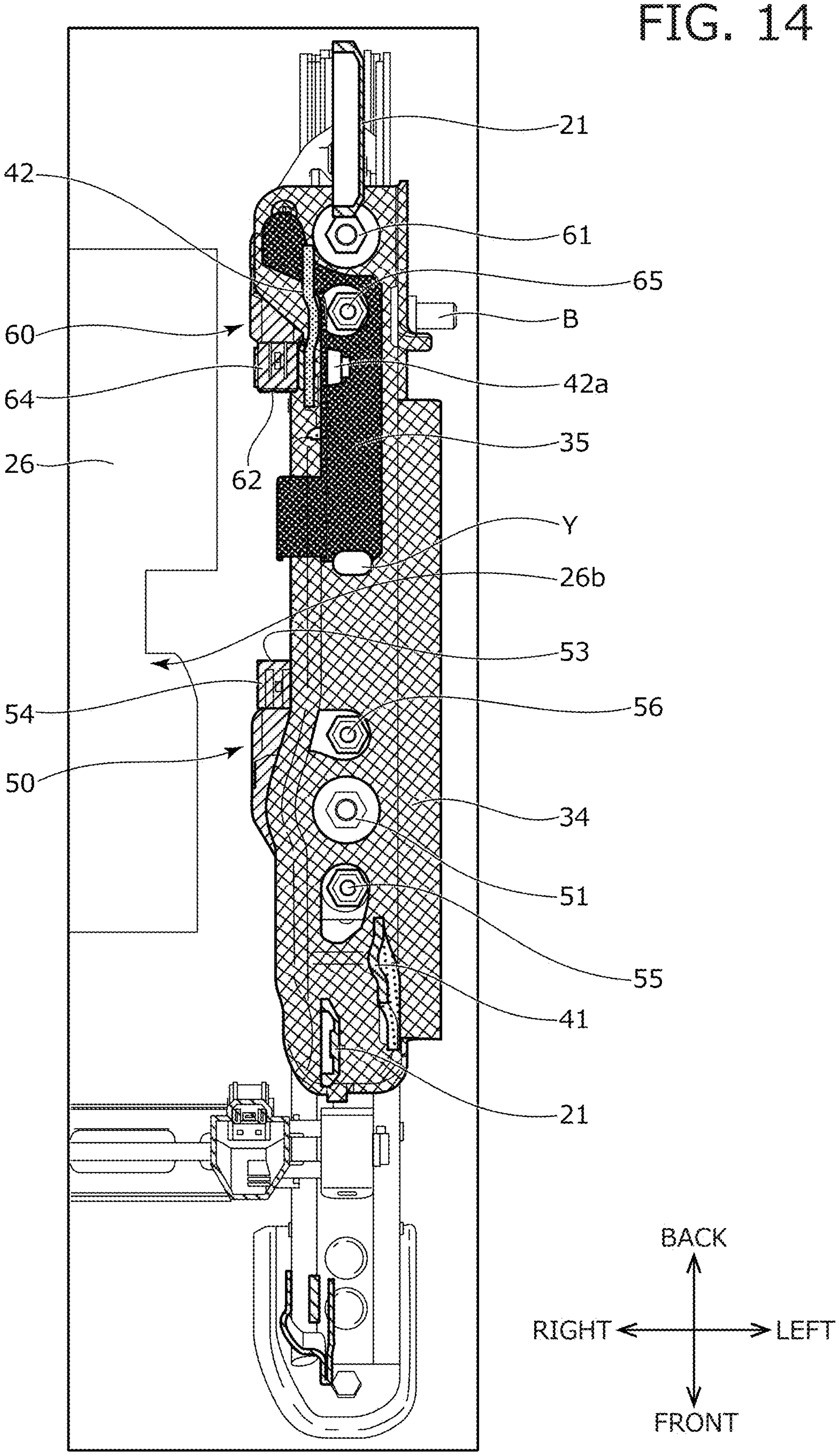
FIG. 14 is a top view showing a configuration at and near support brackets of the seat cushion frame of the vehicle seat.

Further, the second sensor shaft 61 of the rear load detection sensor 60 is arranged between the front link 41 and the rear link 42 in the seat width direction (FIGS. 3, 5, and 14), and the vehicle seat S is prevented from being increased in size in the width direction.

Figure 15:
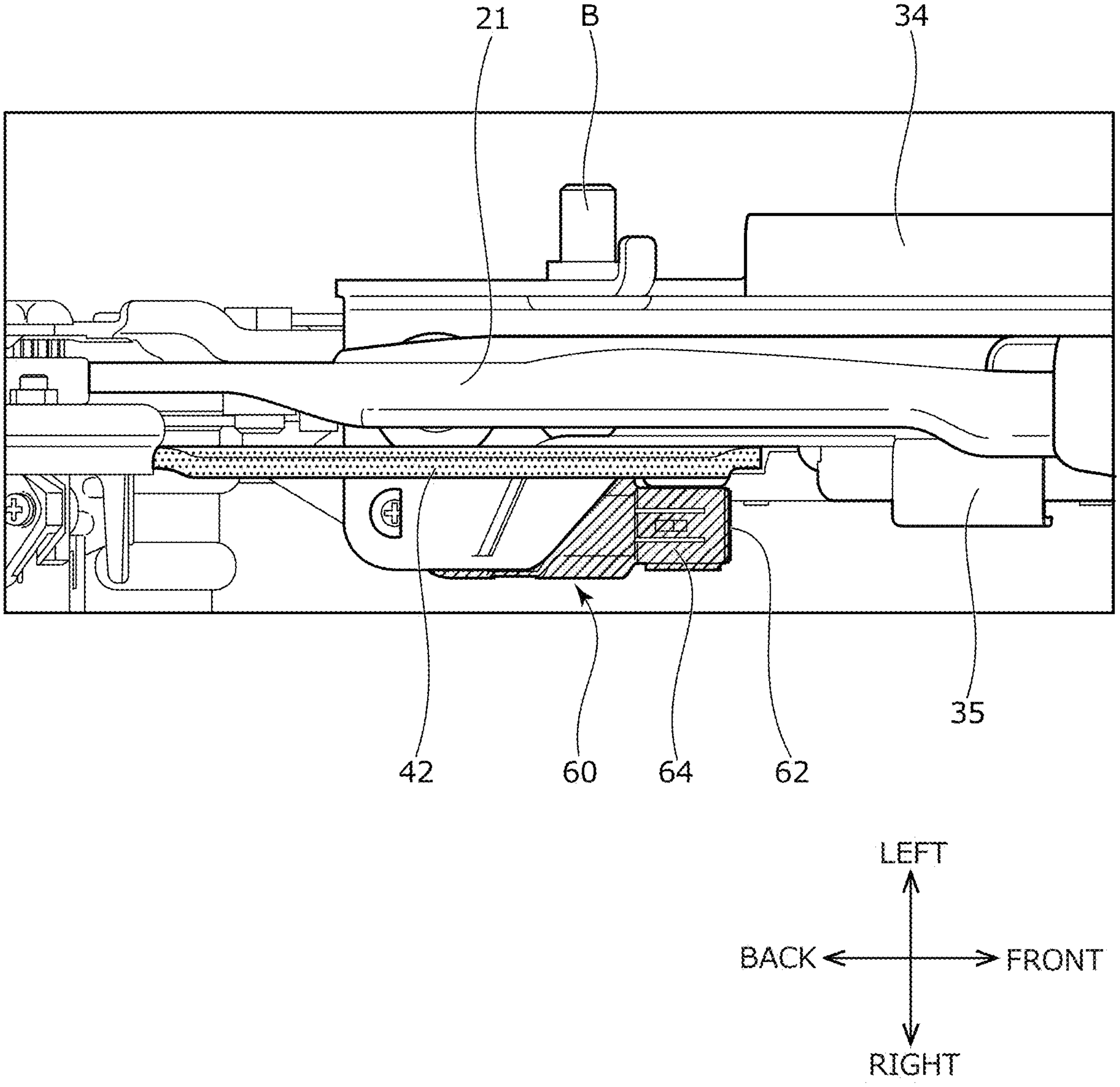
FIG. 15 is a top view showing the rear end portion of the seat cushion frame.

Further, the rear link 42 is arranged between the seat cushion side frame 21 and the second coupler 64 of the rear load detection sensor 60 in the seat width direction (FIG. 15). Thus, in the seat width direction, the rear link 42 is provided within the range between the seat cushion side frame 21 and the second coupler 64, and the vehicle seat S is made more compact accordingly.

Further, the second coupler 64 of the rear load detection sensor 60 is arranged at the same position as the rear link 42 in the front to back direction of the seat (FIG. 10B), which is a compact arrangement. Further, as shown in FIG. 10B, the rear link rotation shaft 42*a* of the rear link 42 is arranged at the same height position as the second sensor shaft 61 in the up to down direction of the seat.

Further, the front link 41 and the rear link 42 are attached to the link support brackets (the first link support bracket 34 and the second link support bracket 35), and the front load detection sensor 50 and the rear load detection sensor 60 are attached to the link support brackets (FIG. 5). Here, as shown in FIG. 8, the first link support bracket 34 is bent upward as it goes rearward from the front end, and is separated from the upper rail 32 of the slide rail mechanism 30 between the attachment position of the front load detection sensor 50 and the attachment position of the second load detection sensor 60 (in other words, between the first sensor shaft 51 and the second sensor shaft 61). According to such a configuration, the number of components constituting the vehicle seat S is reduced, and the rigidity of the link support bracket itself is improved.

Further, the recessed portion 26*b* provided at the side portion 26*a* of the pressure receiving member 26 is arranged between the front load detection sensor 50 and the rear load detection sensor 60 in the front to back direction of the seat. Thus, the recess of the pressure receiving member 26 is compactly arranged in the front to back direction of the seat, so that the rigidity of the pressure receiving member 26 is prevented from being reduced.

Modification

Figure 16:
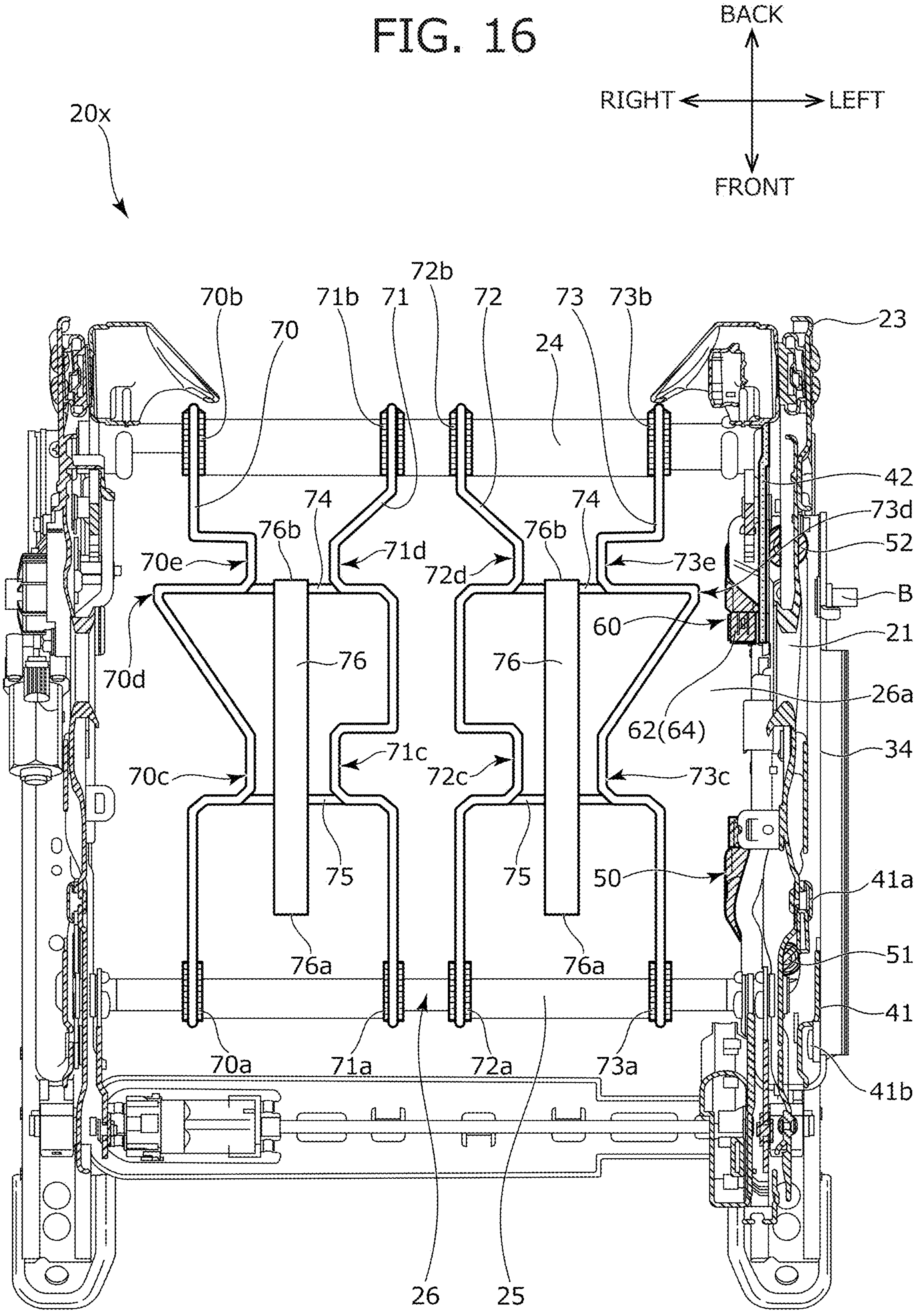
FIG. 16 is a partial cross-sectional view of a seat cushion frame of a vehicle seat according to a modification when viewed from above.

The present invention is not limited to the embodiment described above. FIG. 16 is a partial cross-sectional view of a seat cushion frame 20*x* of the vehicle seat S according to a modification when viewed from above. As shown in FIG. 16, wire springs 70, 71, 72, 73 are suspended between the rear side connecting pipe 24 and the front side connecting pipe 25 of the seat cushion frame 20*x*.

The wire spring 70 includes a spring recessed portion 70*c*, a spring protruded portion 70*d*, and a spring recessed portion 70*e* in order from front to back between a front end 70*a* and a rear end 70*b*. Further, the wire spring 71 includes a spring recessed portion 71*c* and a spring recessed portion 71*d* in order from front to back between a front end 71*a* and a rear end 71*b*. Further, the wire spring 72 includes a spring recessed portion 72*c* and a spring recessed portion 72*d* in order from front to back between a front end 72*a* and a rear end 72*b*. Further, the wire spring 73 includes a spring recessed portion 73*c*, a spring protruded portion 73*d*, and a spring recessed portion 73*e* in order from front to back between a front end 73*a* and a rear end 73*b*.

As shown in FIG. 16, the spring protruded portion 73*d* of the wire spring 73 is arranged to face the second coupler 64 (the sensor connector) arranged at the second sensor front end 62 of the rear load detection sensor 60 in the seat width direction. Further, the spring protruded portion 73*d* and the second coupler 64 (the sensor connector) are arranged so as not to overlap with each other in the up to down direction of the seat.

According to such an arrangement, compared to the case where the spring recessed portion 73*c* or the spring recessed portion 73*e* is arranged to face the second coupler 64 in the seat width direction, the area supporting the occupant with the wire spring 73 can be increased in the seat width direction.

The wire spring 70 and the wire spring 71 are connected to each other at the rear through a rear connecting member 74 and are connected to each other at the front through a front connecting member 75. The rear connecting member 74 and the front connecting member 75 are connected to each other through resin members 76 extending in the front to back direction of the seat. The resin members 76 have a certain degree of elasticity, and have front ends 76*a* and rear ends 76*b*. In the resin members 76, the front ends 76*a* are free ends, and the rear ends 76*b* are fixed ends.

The resin members 76 extend forward from a position rearward of the second coupler 64 (the sensor connector) arranged at the second sensor front end 62 of the rear load detection sensor 60 and extend beyond the front connecting member 75. Thus, the resin members 76 are arranged long in the front to back direction of the seat.

Figure 17:
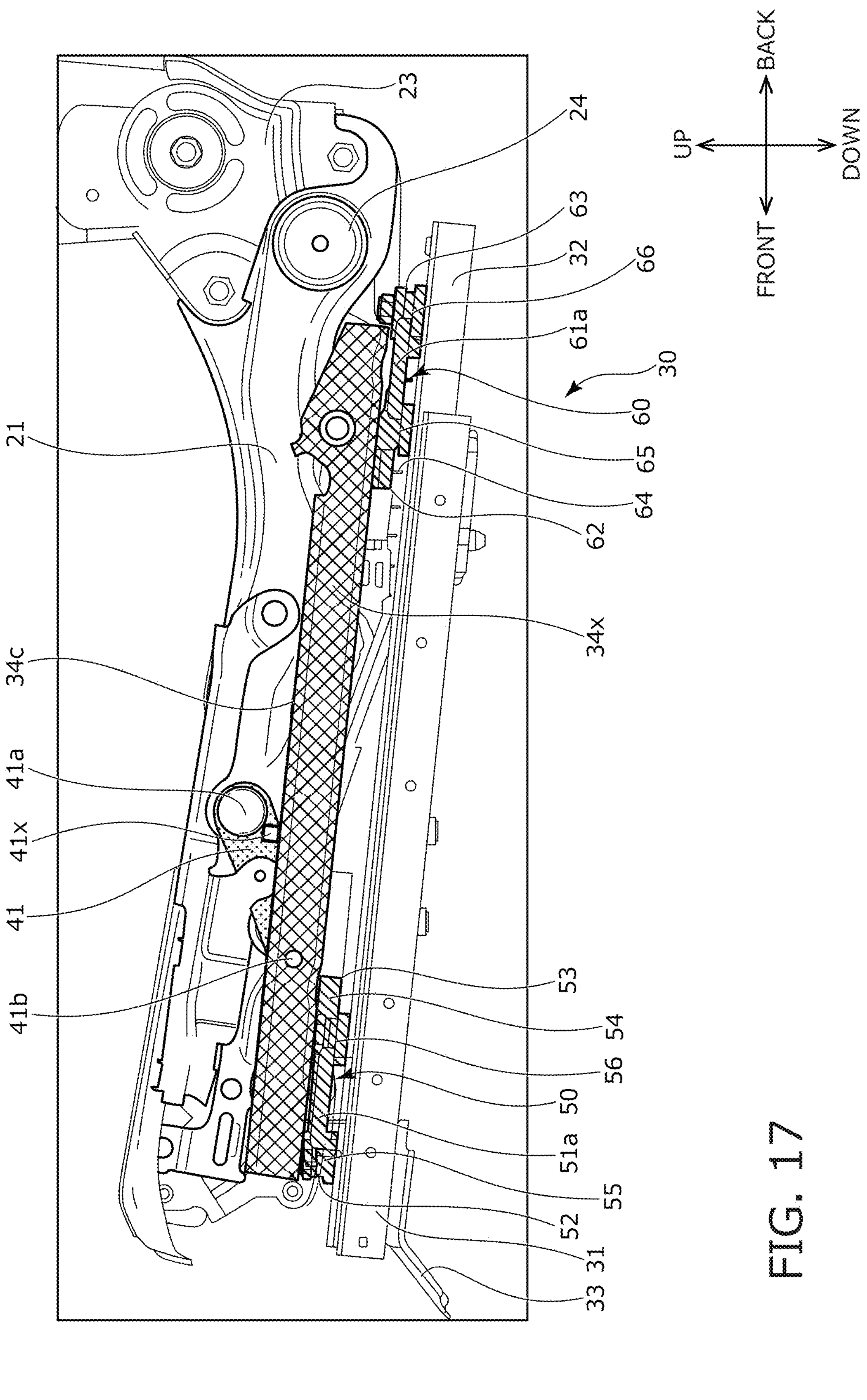
FIG. 17 is a side view of a seat cushion frame of a vehicle seat according to a modification.

FIG. 17 is a side view of a seat cushion frame of a vehicle seat according to another modification. As shown in FIG. 17, a flange 41*x* is formed as a stopper portion that restricts the rotation range of the front link 41 at the rear end portion of the front link 41 on the side of the first rotation shaft 41*a*.

When the seat cushion S2 is located at the lowest position, the flange 41*x* is in contact with an upper surface (a contact portion) of the outer wall 34*c* of a first link support bracket 34*x*. In this manner, the flange 41*x* restricts the front link 41 from rotating further downward. In addition, the protrusion amount of the flange 41*x* is set such that the flange 41*x* protrudes up to the inner side of the outer end portion of the upper surface (the contact portion) of the outer wall 34*c* of the first link support bracket 34*x* in the seat width direction, so that the flange 41*x* is compactly formed.

The upper surface of the outer wall 34*c* of the first link support bracket 34*x* protrudes upward or is recessed downward so as to function as a receiving portion for the flange 41*x*. Furthermore, rubber as an elastic member may be attached to the upper surface of the outer wall 34*c* of the first link support bracket 34.

As shown in FIG. 17, the front load detection sensor 50 may be arranged forward of the second rotation shaft 41*b* of the front link 41.

When the seat cushion S2 is located at the lowermost position, the first rear side fastening member 56 as a rear side attachment member of the front load detection sensor 50 is arranged forward of the second rotation shaft 41*b*, and the front load detection sensor 50 is overall arranged forward of the second rotation shaft 41*b*. With such a configuration, when the front link 41 is provided with the flange 41*x* as the stopper portion, the interference between the front load detection sensor 50 and the front link 41, and an increase in size of seat structure in the up to down direction in design can be prevented.

REFERENCE SIGNS LIST

S vehicle seat (conveyance seat)
S1 seat back
S2 seat cushion
S3 headrest
R skin material
U cushion pad
L operating lever
F seat frame
10 seat back frame
11 upper frame
12 seat back side frame
13 lower member frame
20, 20*x* seat cushion frame
21 seat cushion side frame (side frame)
22 pan frame
23 connecting bracket
24 rear side connecting pipe (rear side connecting member, first rotating shaft)
25 front side connecting pipe
26 pressure receiving member
26*a* side portion
26*b* recessed portion
26*c* round hole
26*d* triangle hole
30 slide rail mechanism (base)
31 lower rail
32 upper rail
33 foot
34, 34*x* first link support bracket (link support bracket)
34*a* bottom wall
34*a*1 front link hole adjacent portion
34*a*2 sensor attachment portion
34*a*3 inclined surface
34*b* inner wall
34*c* outer wall (bent wall portion)
34*d* front link hole
34*e* first shaft hole (shaft hole)
34*f* second shaft hole
34*g* rear hole
34*h* rising portion (front wall)
34*i* through hole
35 second link support bracket (link support bracket)
35*a* bottom wall
35*b* inner wall
35*c* rear link hole
35*d* nut hole
35*e* notched portion
40 height adjustment mechanism
41 front link (first link member)
41*a* first rotation shaft

41*b* second rotation shaft (front link rotation shaft)
41*c* upper end portion
41*x* flange
42 rear link (second link member)
42*a* rear link rotation shaft
42*b* rear end portion
42*c* circular arc-shaped portion
42*d* link member recessed portion
50 front load detection sensor (first load detection sensor, load detection sensor)
51 first sensor shaft (sensor shaft, front sensor shaft)
51*a* first flexure element
51*b* upper end portion
52 first sensor front end
53 first sensor rear end
54 first coupler
55 first front side fastening member
56 first rear side fastening member
60 rear load detection sensor (second load detection sensor, load detection sensor)
61 second sensor shaft (sensor shaft)
61*a* second flexure element
62 second sensor front end
63 second sensor rear end
64 second coupler (coupler)
65 second front side fastening member
66 second rear side fastening member
B buckle support bracket attachment portion
Y welded portion
70, 71, 72, 73 wire spring (pressure receiving member)
70*a*, 71*a*, 72*a*, 73*a* front end
70*b*, 71*b*, 72*b*, 73*b* rear end
70*c*, 71*c*, 72*c*, 73*c* spring recessed portion
70*d*, 73*d* spring protruded portion
70*e*, 71*d*, 72*d*, 73*e* spring recessed portion
74 rear connecting member
75 front connecting member
76 resin member
76*a* front end
76*b* rear end

What is claimed is:

1. A conveyance seat, comprising:
a seat cushion; and
a link member configured to adjust a height of the seat cushion with respect to a base that is a slide rail or a vehicle body floor;
a load detection sensor attached to the base and configured to detect a load applied to the conveyance seat; and
a link support bracket that is fixed to an upper surface of the base via the load detection sensor and rotatably supports a lower end portion of the link member, wherein
the link support bracket includes a bottom wall to which the load detection sensor is attached and an outer wall standing from the bottom wall,
a front link hole is formed at a front end portion of the outer wall corresponding the lower end portion of the link member,
the bottom wall includes a front link hole adjacent portion that is a portion adjacent to the front link hole and a sensor attachment portion that is a portion to which the load detection sensor is attached, and
the front link hole adjacent portion is located below the sensor attachment portion.

2. The conveyance seat according to claim 1, wherein the front link hole adjacent portion is connected to the sensor attachment portion via an inclined surface.

3. The conveyance seat according to claim 1, wherein
a front end portion of the outer wall and a portion of the outer wall that stands from the sensor attachment portion are integrally formed, and
the outer wall is bent outward in a seat width direction and cover an upper portion of the front link hole.

4. The conveyance seat according to claim 1, wherein
the link support bracket further includes an inner wall standing from the bottom wall,
a portion of the inner wall that stands from the front link hole adjacent portion, a portion of the inner wall that stands from the sensor attachment portion, and the outer wall are integrally formed, and
the inner wall is bent inward in a seat width direction.

5. The conveyance seat according to claim 1, wherein the inner wall is disposed to face the outer wall while avoiding an area opposite the front link hole provided in the outer wall.

6. The conveyance seat according to claim 1, wherein
the load detection sensor includes a front load detection sensor and a rear load detection sensor arranged behind the front load detection sensor,
the link member includes a front link and a rear link arranged behind the front link,
the front link includes a front link rotation shaft at a lower end portion of the front link,
the rear link includes a rear link rotation shaft at a lower end portion of the rear link,
the front link rotation shaft is located in front of the front load detection sensor, and
the rear link rotation shaft is located in front of the rear load detection sensor.

7. The conveyance seat according to claim 1, wherein
the link support bracket further includes an inner wall standing from the bottom wall,
the load detection sensor includes a front load detection sensor and a rear load detection sensor arranged behind the front load detection sensor, and
the inner wall is curved inward in a seat width direction when viewed from above within a range that overlaps the front load detection sensor in a seat front to back direction.

8. The conveyance seat according to claim 1, wherein
the link support bracket further includes an inner wall standing from the bottom wall,
the load detection sensor includes a front load detection sensor and a rear load detection sensor arranged behind the front load detection sensor,
a shaft hole is formed in the bottom wall corresponding to a sensor shaft of the front load detection sensor, and
the inner wall is curved inward in a seat width direction when viewed from above within a range that overlaps the shaft hole in a seat front to back direction.

9. The conveyance seat according to claim 1, wherein
the link support bracket further includes a front wall standing from a front end of the bottom wall,
the link member includes a front link and a rear link arranged behind the front link,
the front link includes a front link rotation shaft at a lower end portion of the front link, and
an upper edge of the front wall is located at a lower position than a center line of the front link rotation shaft.

10. The conveyance seat according to claim 1, wherein
the load detection sensor is attached to the upper surface of the base by a fastening member,
the bottom wall is provided with a through hole into which the fastening member is inserted, and
the through hole extends to reach the inner wall.

11. The conveyance seat according to claim 1, further comprising:
a seat cushion frame that forms a framework of the seat cushion, wherein
the seat cushion frame includes
seat cushion side frames located at opposite end portions in a seat width direction, and
a rear side connecting member that connects rear end portions of the seat cushion side frames, and
when the seat cushion is located at the lowest position, at least a portion of the bottom wall is located at a same height as the rear side connecting member in a seat up to down direction.

12. The conveyance seat according to claim 1, wherein
the link member includes a front link and a rear link arranged behind the front link,
the front link is disposed on an outer wall side in the link support bracket,
the rear link is disposed on an inner wall side in the link support bracket, and
a sensor shaft of the load detection sensor is arranged between the front link and the rear link in a seat width direction.

13. The conveyance seat according to claim 1, further comprising:
a seat cushion frame that forms a framework of the seat cushion, wherein
the seat cushion frame includes a seat cushion side frame arranged at a side portion of the seat cushion frame,
the load detection sensor includes a front load detection sensor and a rear load detection sensor arranged behind the front load detection sensor,
the link member includes a front link and a rear link arranged behind the front link,
the rear load detection sensor includes
a sensor shaft provided between a front end of the rear load detection sensor and a rear end of the rear load detection sensor, and
a coupler provided at the front end of rear load detection sensor configured to be connected to an external electronic device, and
the rear link is arranged between the seat cushion side frame and the coupler in a seat width direction and on an inner side of the inner wall in the seat width direction.

14. The conveyance seat according to claim 13, wherein
the rear link includes a rear link rotation shaft at a lower end portion of the rear link,
the coupler is arranged in a same position as the rear link in a seat front to back direction, and
the rear link rotation shaft is located at a same height as the sensor shaft of the rear load detection sensor in a seat up to down direction.

15. The conveyance seat according to claim 1, wherein
the load detection sensor includes a front load detection sensor and a rear load detection sensor arranged behind the front load detection sensor, and
the link support bracket is bent upward as the link support bracket extends rearward from a front end of the link support bracket, and is separated from the base between an attachment position of the front load detection sensor and an attachment position of the rear load detection sensor.

16. The conveyance seat according to claim 1, further comprising:

a seat cushion frame that forms a framework of the seat cushion, wherein the seat cushion frame includes seat cushion side frames located at opposite end portions in a seat width direction, the seat cushion includes a pressure receiving member provided between the seat cushion side frames, a recessed portion recessed inward is provided at a side portion of the pressure receiving member in the seat width direction, the load detection sensor includes a front load detection sensor and a rear load detection sensor arranged behind the front load detection sensor, and the recessed portion is located between the front load detection sensor and the rear load detection sensor in a seat front to back direction.

17. The conveyance seat according to claim 1, wherein the link member includes a link member recessed portion recessed upward from a bottom, and when the seat cushion is located at the lowest position, the load detection sensor is disposed to face the link member recessed portion in a seat up to down direction.

18. The conveyance seat according to claim 17, wherein the link member includes a front link and a rear link arranged behind the front link, and the link member recessed portion is provided in the rear link.

19. The conveyance seat according to claim 1, further comprising:

a seat back;

a headrest; and a seat frame that includes a seat back frame and a seat cushion frame, wherein the seat back and the seat cushion respectively include cushion pads placed on the seat back frame and the seat cushion frame, and skin materials covering surfaces of the cushion pads, the slide rail configured to slide the seat cushion in a seat front to back direction is arranged below the seat cushion, a height adjuster configured to adjust a height of the seat cushion is provided between the seat cushion and the slide rail, and the base is the slide rail and the load detection sensor is attached to the slide rail.

20. A method for manufacturing a conveyance seat having a seat cushion, comprising:

attaching a load detection sensor configured to detect a load applied to the conveyance seat to a base that is a slide rail or a vehicle body floor of the conveyance seat;

fixing a link support bracket to an upper surface of the base via the load detection sensor; and rotatably mounting a lower end portion of a link member configured to adjust a height of the seat cushion with respect to the base on the link support bracket, wherein the link support bracket includes a bottom wall to which the load detection sensor is attached and an outer wall standing from the bottom wall, a front link hole is formed at a front end portion of the outer wall corresponding the lower end portion of the link member, the bottom wall includes a front link hole adjacent portion that is a portion adjacent to the front link hole and a sensor attachment portion that is a portion to which the load detection sensor is attached, and the front link hole adjacent portion is located below the sensor attachment portion.

* * * * *